United States Patent
Goda et al.

(10) Patent No.: US 11,972,172 B2
(45) Date of Patent: Apr. 30, 2024

(54) DISPLAY INFORMATION GENERATION APPARATUS, DISPLAY INFORMATION GENERATION METHOD, AND DISPLAY INFORMATION GENERATION PROGRAM

(71) Applicant: NIPPON TELEGRAPH AND TELEPHONE CORPORATION, Tokyo (JP)

(72) Inventors: Takuya Goda, Musashino (JP); Shinichiro Eitoku, Musashino (JP); Akihiro Chiba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 116 days.

(21) Appl. No.: 17/595,177
(22) PCT Filed: May 30, 2019
(86) PCT No.: PCT/JP2019/021621
§ 371 (c)(1),
(2) Date: Nov. 10, 2021
(87) PCT Pub. No.: WO2020/240795
PCT Pub. Date: Dec. 3, 2020

(65) Prior Publication Data
US 2022/0222038 A1 Jul. 14, 2022

(51) Int. Cl.
*G06F 3/16* (2006.01)
*G06V 10/12* (2022.01)
*G06V 40/16* (2022.01)

(52) U.S. Cl.
CPC .............. *G06F 3/167* (2013.01); *G06V 10/12* (2022.01); *G06V 40/161* (2022.01)

(58) Field of Classification Search
CPC ....... G06F 3/167; G06V 10/12; G06V 40/161
See application file for complete search history.

(56) References Cited

U.S. PATENT DOCUMENTS

| | | | |
|---|---|---|---|
| 10,185,711 B1* | 1/2019 | Shires | G10L 21/10 |
| 2014/0181630 A1* | 6/2014 | Monney | G06F 16/58 |
| | | | 715/232 |
| 2016/0328376 A1* | 11/2016 | MacFarlane | H04L 67/52 |

FOREIGN PATENT DOCUMENTS

| | | |
|---|---|---|
| JP | H05236131 A | 9/1993 |
| JP | 2005107595 A | 4/2005 |
| JP | 2012119927 A | 6/2012 |

OTHER PUBLICATIONS

Naohiro Kishishita et al., Investigation on the Peripheral Visual Field for information Display with Wide-view See-through HMDs, Journal of the Virtual Reality Society of Japan, vol. 19, No. 2, 2014, pp. 121-130.

* cited by examiner

*Primary Examiner* — Stephen G Sherman
(74) *Attorney, Agent, or Firm* — Harness, Dickey & Pierce, P.L.C.

(57) ABSTRACT

A display information generation device includes an importance calculation unit (111) and a display information generation unit (112). The importance calculation unit receives at least one user object for at least one user (U), a plurality of speaker objects for a plurality of speakers (S1, S2) having a conversation with the at least one user, and a plurality of annotations with respect to each object generated for the at least one user object and the plurality of speaker objects, and calculates importance of the conversation between the one user and each of the plurality of speakers based on at least one of the plurality of speaker objects or the plurality of annotations. The display information generation unit determines a display form of each of the plurality of annotations generated with respect to the plurality of speaker objects based on the importance of the conversation, and generates display information on the plurality of annotations each having the display form.

3 Claims, 35 Drawing Sheets

| KEY | FACIAL IMAGE | PERSON SCORE |
|---|---|---|
| 1 | PERSON A | 30 |
| 2 | PERSON B | 50 |
| 3 | PERSON C | 5 |

| | PERSON 1 IMPORTANCE | PERSON 2 IMPORTANCE |
|---|---|---|
| RATIO IN CAMERA DATA | 0.7 | 0.3 |

| SCORE TYPE | IMPORTANCE OF THE CONVERSATION DETERMINATION TECHNIQUE | PERSON 1 | PERSON 2 |
|---|---|---|---|
| SCORE 1 | RATIO IN CAMERA DATA | 0.8 | 0.2 |
| SCORE 2 | DIALOGUE CONTINUATION USING DIALOG BREAKDOWN LEVEL | 0.7 | 0.3 |
| SCORE 3 | IMPORTANT PERSON SCORE USING FACE RECOGNITION | 30/80 = 0.375 | 50/80 = 0.625 |

DISPLAY INFORMATION GENERATION APPARATUS, DISPLAY INFORMATION GENERATION METHOD, AND DISPLAY INFORMATION GENERATION PROGRAM

CROSS-REFERENCE TO RELATED APPLICATIONS

This application is a 371 U.S. National Phase of International Application No. PCT/JP2019/021621 filed on May 30, 2019. The entire disclosures of the above applications are incorporated herein by reference.

TECHNICAL FIELD

The present invention relates to a display information generation device, a display information generation method, and a display information generation program.

BACKGROUND ART

Non Patent Literature 1 discloses a technique for displaying an annotation corresponding to a single object on a head-mounted display. Annotations are presented at the same level, e.g., the same size, the same color, or the like, for even with objects having different properties.

CITATION LIST

Non Patent Literature

Non Patent Literature 1: "Investigation on the Peripheral Visual Field for Information Display with Wide-view See-through HMDs", Japanese Virtual Reality Society Journal, Vol. 19, No. 2, pp. 121-130, 2014

SUMMARY OF THE INVENTION

Technical Problem

Non Patent Literature 1 does not disclose presenting a plurality of annotations for a plurality of objects, respectively.

When a plurality of annotations are presented, it is difficult for the user to know which annotation is important.

In light of the circumstances described above, an object of the present invention is to provide a display information generation device, a display information generation method, and a display information generation program that can intelligently present to a user which of a plurality of annotations is important.

Means for Solving the Problem

A first aspect of the present invention provides a display information generation device including: an importance calculation unit configured to receive at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects to calculate importance of the conversation between the at least one first speaker and each of the plurality of second speakers based on at least one of the plurality of second speaker objects or the plurality of annotations; and a display information generation unit configured to determine a display form of each of the plurality of annotations generated with respect to the plurality of second speaker objects based on the importance of the conversation calculated by the importance calculation unit, and generate display information on the plurality of annotations each having the display form.

A second aspect of the present invention provides a display information generation method including: receiving at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects, and at a computer, calculating importance of the conversation between the at least one first speaker and each of the plurality of second speakers based on at least one of the plurality of second speaker objects or the plurality of annotations; and at the computer, determining a display form of each of the plurality of annotations generated with respect to the plurality of second speaker objects based on the importance of the conversation, and generating display information on the plurality of annotations each having the display form.

A third aspect of the present invention provides a computer-readable display information generation program causing a computer of a display information generation device to function as: an importance calculation unit configured to receive at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects to calculate importance of the conversation between the at least one first speaker and each of the plurality of second speakers based on at least one of the plurality of second speaker objects or the plurality of annotations; and display information generation unit configured to determine a display form of each of the plurality of annotations generated with respect to the plurality of second speaker objects based on the importance of the conversation, and generating display information on the plurality of annotations each having the display form.

Effects of the Invention

According to the present invention, it is possible to provide a display information generation device, a display information generation method, and a display information generation program that can intelligently present to a user which of a plurality of annotations is important.

BRIEF DESCRIPTION OF DRAWINGS

FIG. 6 is a view illustrating an example of contents in a face recognition DB.

FIG. 9 is a view illustrating an example of contents in a score table.

FIG. 15 is a view illustrating an example of contents in a score table when performing the fourth importance calculation technique.

DESCRIPTION OF EMBODIMENTS

Hereinafter, an embodiment of the present disclosure will be described in detail with reference to the drawings.

First Embodiment

Figure 1:
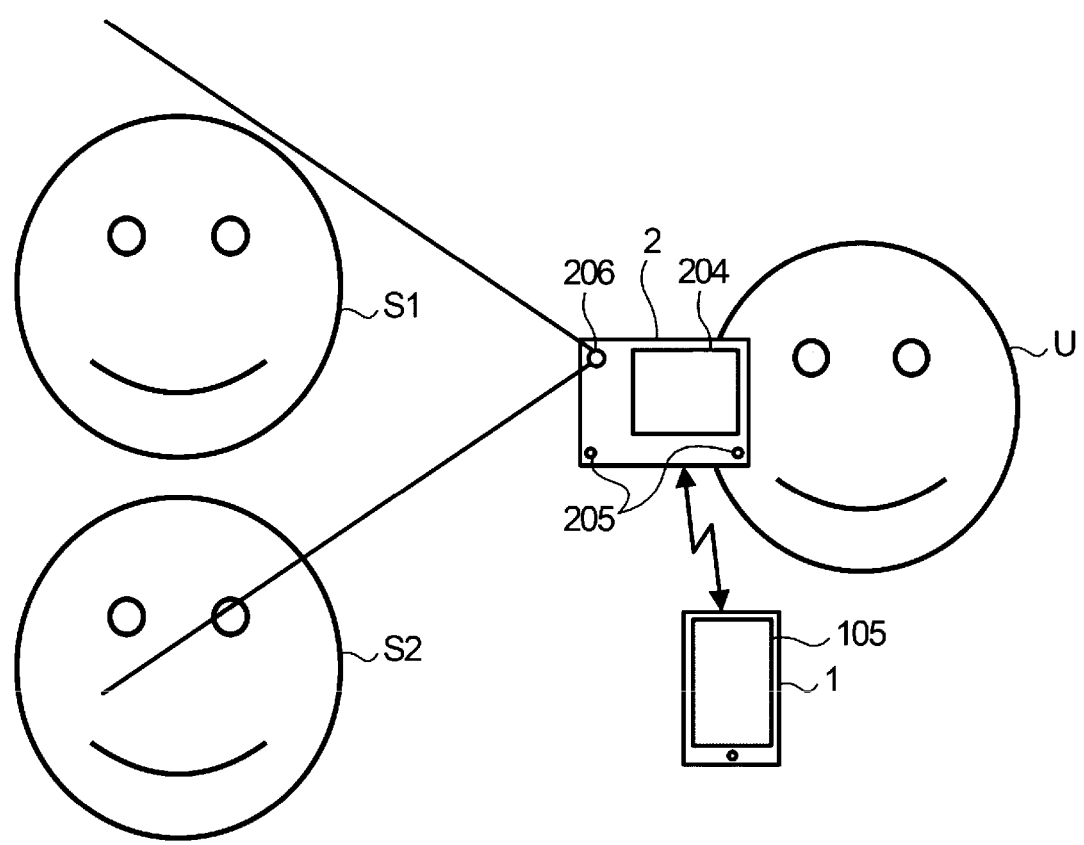
FIG. 1 is a schematic view illustrating a usage mode of an information presentation system including a display information generation device according to a first embodiment.

FIG. 1 is a schematic view illustrating a usage mode of an information presentation system including a display information generation device according to a first embodiment. This figure illustrates the situation in which one user U faces two speakers S1, S2, who have a conversation with the user U. This embodiment is an example in which a single person has a conversation with a plurality of persons. Of course, the number of speakers is not limited to two, and may be three or more.

The information presentation system includes a user terminal 1 into which a display information generation device is incorporated, and a display terminal 2 that communicates with the user terminal 1 and displays information. The user terminal 1 may be a portable information processing terminal such as a smart phone or a tablet terminal.

Figure 2A:
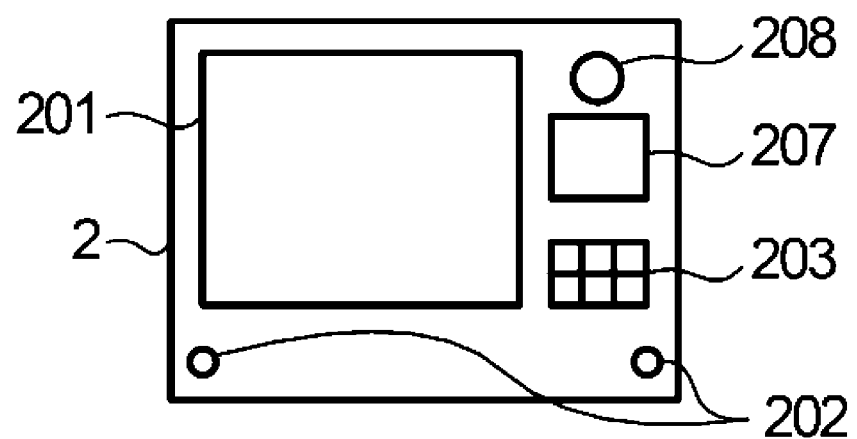
FIG. 2A is a front view of a display terminal.

FIG. 2A is a front view of the display terminal 2. A front display 201, a front stereo microphone 202, and a keyboard 203 are disposed on the front face of the display terminal 2. The front display 201 displays information to be presented to the user U. The front stereo microphone 202 acquires sound on the side of the front face of the display terminal 2, in particular, speech of the user U. A plurality of operation keys for operating the display terminal 2 by the user U are disposed together on the keyboard 203. Instead of being disposed together as the keyboard 203, the plurality of operation keys may be distributed on the front face, the side faces, the top face, and the like of the display terminal 2.

Figure 2B:
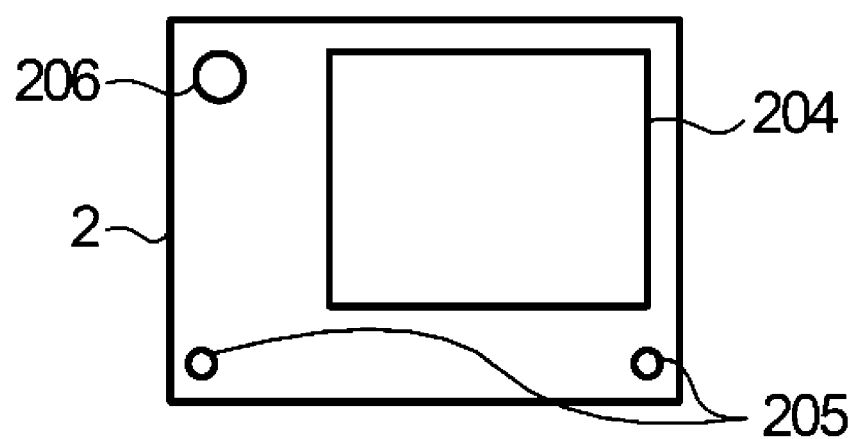
FIG. 2B is a rear view of the display terminal.

FIG. 2B is a rear view of the display terminal 2. A rear display 204, a rear stereo microphone 205, and a rear camera 206 are disposed on the rear face of the display terminal 2. The rear display 204 displays information to be presented to the speakers S1, S2. The rear stereo microphone 205 acquires sound on the side of the rear face of the display terminal 2, and in particular, speech of the speakers S1, S2. The rear camera 206 acquires an image of the side of the rear face of the display terminal 2, and in particular, the speakers S1, S2. In using the display terminal 2, the user U holds the display terminal 2 such that a face of at least one of the speakers S1, S2 falls within the angle of view of the rear camera 206.

As illustrated in FIG. 2A, the front face of the display terminal 2 may be further provided with a front sub-display 207. The front sub-display 207 displays images captured by the rear camera 206. The display on the front sub-display 207 allows the user U to check whether or not the face of the speakers S1, S2 falls within the angle of view of the rear camera 206. It is also possible to omit the front sub-display 207 by enabling the image captured by the rear camera 206 to be displayed on the front display 201 or superimposed as a picture in picture.

The front face of the display terminal 2 may be further provided with a front camera 208. The front camera 208 acquires an image on the side of the front face of the display terminal 2. The image captured by the front camera 208 may be switched from the image captured by the rear camera 206 by the operation of the operation key, and displayed on the front display 201 or the front sub-display 207.

The front display 201 and rear display 204 may be configured as a single transmissive display. In this case, information presented to the speakers S1, S2 is displayed on the transmissive display as an inverted image such that the speakers S1, S2 can read the information.

Figure 3:
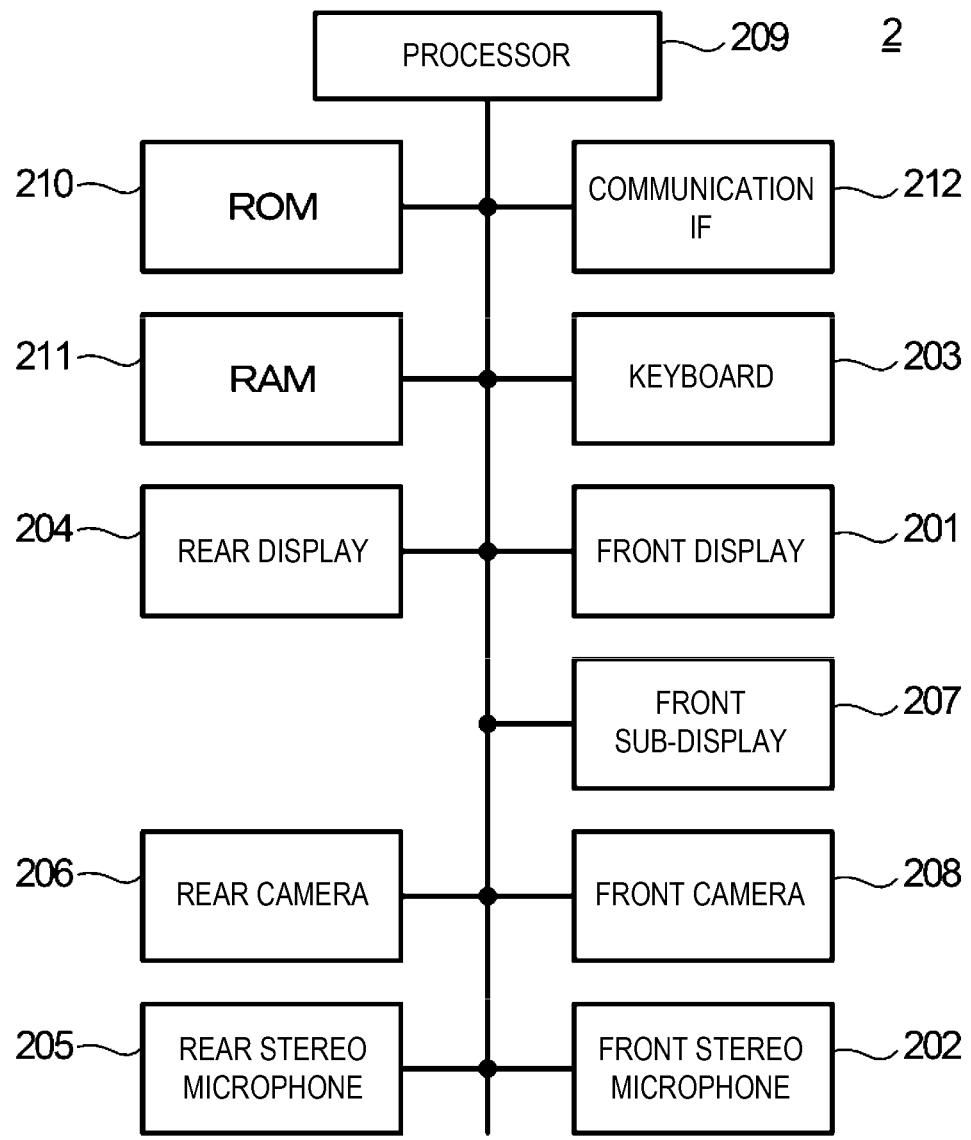
FIG. 3 is a block diagram of the display terminal.

FIG. 3 is a block diagram of the display terminal 2. In addition to the configuration described above, the display terminal 2 includes a processor 209, a Read Only Memory (ROM) 210, a Random Access Memory (RAM) 211, a communication IF (Interface) 212, and the like. The processor 209 is, for example, a Central Processing Unit (CPU). The processor 209 executes a control program stored in the ROM 210 to implement various processing functions. The ROM 210 stores the control program, control data, and the like that manage the operation of the display terminal 2. The control program includes a portion of a below-mentioned display control application program (hereinafter, the application program is abbreviated as application). The RAM 211 is a main memory that functions as a working memory. The communication IF 212 is an interface unit that adopts the low-power wireless data communication standard, such as Bluetooth (registered trademark), and performs data communication with the user terminal 1.

The speech acquired by the front stereo microphone 202 or the rear stereo microphone 205 is compressed in any speech compression format such as Code Excited Linear Prediction Coder (CELP) by the processor 209, and transmitted to the user terminal 1 as speech data via the communication IF 212. Images captured by the front camera 208 or the rear camera 206 every certain time are compressed in any image compression format such as Joint Photographic Experts Group (JPEG) by the processor 209, and transmitted to the user terminal 1 as camera data via the communication IF 212. The speech and the image may be compressed in any video compression format such as Moving Picture Experts Group (MPEG) and transmitted as video data to the user terminal 1. The compression formats of speech, image, and video are not limited to these. They may be transmitted without being compressed.

Display result graphic data received from the user terminal 1 via the communication IF 212 is distributed to the front display 201 or the rear display 204 by the processor 209 and displayed thereon.

Figure 4:
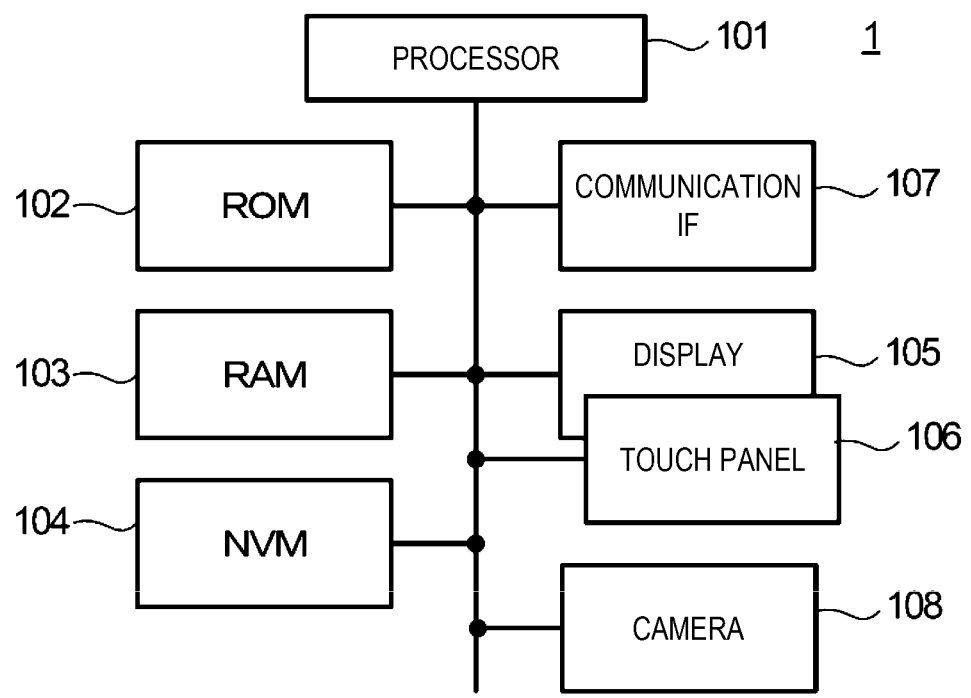
FIG. 4 is a block diagram of a user terminal.

FIG. 4 is a block diagram of the user terminal 1. The user terminal 1 includes a processor 101, a ROM 102, a RAM 103, a Nonvolatile Memory (NVM) 104, a display 105, a touch panel 106, a communication IF 107, a camera 108, and the like.

The processor 101 may be, for example, a CPU. The processor 101 executes a control program stored in the ROM 102 or the NVM 104 to implement various processing functions. The ROM 102 stores a control program, control data, and the like that manage the operation of the user terminal 1. The RAM 103 is a main memory that functions as a working memory. The NVM 104 is a rewritable non-volatile storage device such as SRAM or flash memory. The NVM 104 stores an application and data for implementing various processing functions. The application stored in the NVM 104 includes a below-mentioned display information generation program, a portion of a display control program, etc. The display 105 is a display device such as a liquid crystal display. The touch panel 106 is a touch input device disposed on a display face of the display 105. The user terminal 1 can have any operation key other than the touch panel 106. The communication IF 107 is an interface unit that adopts the low-power wireless data communication standard such as Bluetooth, and performs data communication with the display terminal 2. The communication IF 107 can further include a wireless communication interface unit, for example, a mobile telephone communication system such as 4G or 5G, wireless LAN, or the like. The camera 108 serves to capture an image, and can be provided on both the front face and the rear face of the user terminal 1.

The speech data and camera data (or video data) received from the display terminal 2 via the communication IF 107 are recovered to original speech and image and processed by the processor 101 that functions as a display information generation device. As a result of the processing, the display result graphic data generated by the processor 101 is transmitted to the display terminal 2 via the communication IF 107.

Figure 5:
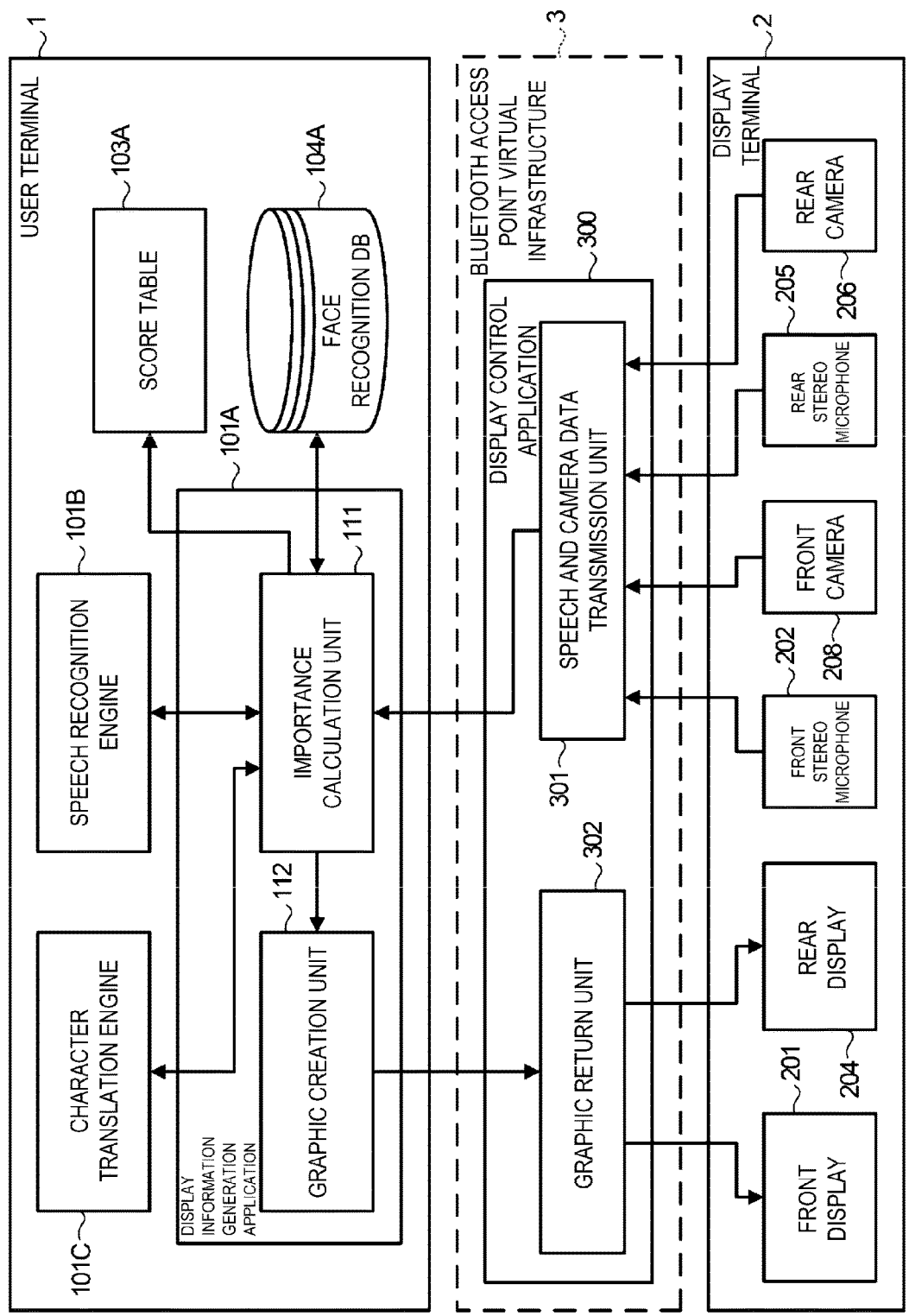
FIG. 5 is a functional configuration view of an information presentation system.

FIG. 5 is a view illustrating a functional configuration view of an information presentation system. The information presentation system functionally includes a Bluetooth access point virtual infrastructure 3 between the user terminal 1 and the display terminal 2. The Bluetooth access point virtual infrastructure 3 is constituted of the communication IF 107 of the user terminal 1, the communication IF 212 of the display terminal 2, the processor 101 of the user terminal 1, and the processor 209 of the display terminal 2. In other words, the processors 101 and 209 execute processing according to a display control application 300, thereby controlling the communication IF 107 and 212 to transmit and receive data between the user terminal 1 and the display terminal 2. Out of the display control application 300, a portion for the processor 101 is stored in the NVM 104 of the user terminal 1, and a portion for the processor 209 is stored in the ROM 210 of the display terminal 2. The processors 101 and 209 can perform the display control application 300, thereby functioning as a speech and camera data transmission unit 301 and a graphic return unit 302.

The speech and camera data transmission unit 301 transmits at least the speech acquired by the rear stereo microphone 205 of the display terminal 2 and the camera data (image) acquired by the rear camera 206 as a speaker object about the speaker, to the user terminal 1. The speech and camera data transmission unit 301 further transmits at least the former of the speech acquired by the front stereo microphone 202 of the display terminal 2 and the camera data acquired by the front camera 208 as a user object about the user, to the user terminal 1.

The graphic return unit 302 transmits at least display result graphic data generated in the user terminal 1, which is a displayed image to be displayed on the front display 201 of the display terminal 2, from the user terminal 1 to the display terminal 2. The graphic return unit 302 can further transmit display result graphic data generated in the user terminal 1, which is to be displayed on the rear display 204 of the display terminal 2, from the user terminal 1 to the display terminal 2. The display result graphic data generated in the user terminal 1 will be described later.

The user terminal 1 functionally includes a display information generation application 101A, a speech recognition engine 101B, a character translation engine 101C, a score table 103A, a face recognition database (DB) 104A, and the like. The display information generation application 101A is a display information generation program for causing the processor 101 to function as a display information generation device according to the embodiment, and is stored in the NVM 104. The processor 101 can execute the display information generation application 101A, thereby functioning as an importance calculation unit 111 and the graphic creation unit 112. The score table 103A is a table in the RAM 103, which is configured while the processor 101 executes the display information generation application 101A. As described later, while the processor 101 executes the display information generation application 101A, the score table 103A can store data indicative of the importance of the conversation with the speakers S1, S2 or score data of the speakers S1, S2. The face recognition DB 104A is a database that can be stored in the NVM 104, which stores facial images of the user U and the speakers S1, S2. The facial images are previously captured by the camera 108.

The speech recognition engine 101B performs speech recognition on input speech to generate a character string corresponding to the input speech. That is, the speech recognition engine 101B generates a speech recognition result character string corresponding to the input speech object, as an annotation. In this embodiment, the speech object of the user U and the speech objects of the plurality of speakers S1, S2, which are transmitted from the display terminal 2, are input from the importance calculation unit 111 to the speech recognition engine 101B. The speech recognition engine 101B outputs the speech recognition result character strings to the importance calculation unit 111. The speech recognition engine 101B supports two or more languages, and can output the speech recognition result character strings in each language. Various speech recognition engines 101B are offered by various vendors, and one of them can be utilized. The speech recognition engine 101B may not be provided in the user terminal 1, and may be offered from the network via the communication IF 107.

The character translation engine 101C performs translation of the input character string by a known translation engine to generate a translation result character string corresponding to the input character string. The character translation engine 101C supports two or more languages, enabling bidirectional translation between the languages. The character translation engine 101C previously registers native language of the user U as known information, and can specify the language to translate. The character translation engine 101C generates a translation result character string corresponding to the input character string object as an annotation. In this embodiment, the speech recognition result character string output from the speech recognition engine 101B is input as a character string object from the importance calculation unit 111 to the character translation engine 101C. Various character translation engines 101C are offered by various vendors, and one of them can be utilized. The character translation engine 101C may not be provided in the user terminal 1, and may be offered from the network via the communication IF 107.

The importance calculation unit 111 calculates the importance of the conversation between the user U and each of the speakers S1, S2. For example, the importance calculation unit 111 can calculate the importance of the conversation based on the camera data (image) objects from the display terminal 2, which are speaker objects for the speakers S1, S2. For example, the importance calculation unit 111 can calculate the importance of the conversation based on the speech recognition result character string that is the annotation from the speech recognition engine 101B, or the speech recognition result character string and the translation result character string that is the annotation from the character translation engine 101C. The importance calculation unit 111 outputs the result character strings that are the annotations from the speech recognition engine 101B and the character translation engine 101C, and the importance of the corresponding conversation to the graphic creation unit 112.

Note that the importance calculation unit 111 can determine which speech recognition result character string or translation result character string corresponds to speech of a person in the conversation based on the camera data object acquired from the display terminal 2. For example, when the speech object has been transmitted from the display terminal 2, the importance calculation unit 111 can determine who is speaking depending on which person's mouth is moving in each facial image in a series of camera data acquired by the rear camera 206 and the front camera 208. Alternatively, the importance calculation unit 111 can determine the person based on the speech object acquired from the display terminal 2. That is, when the speech object that is a source of the character string is the speech acquired by the front stereo microphone 202, the importance calculation unit 111 can determine that the character string corresponds to the speech of the user U. In contrast, when the speech object is speech acquired by the rear stereo microphone 205, the speaker is S1 or S2. In such a case, the importance calculation unit 111 can determine the speaking person by, for example, detecting a voiceprint, or detecting a direction of and a distance to the speaker based on the volume, phase, and the like of the input speech between a left microphone and a right microphone of the rear stereo microphone 205.

For example, any of the following three techniques or combinations thereof may be adopted as the importance calculation technique performed for a conversation by the importance calculation unit 111. Of course, the importance calculation unit 111 may adopt other techniques. It is sufficient that the importance calculation unit 111 may adopt at least one importance calculation technique, and does not necessarily implement a plurality of calculation techniques. Furthermore, the importance calculation unit 111 may be provided with a plurality of importance calculation techniques such that the user U can specify which of the importance calculation techniques is adopted.

First Importance Calculation Technique

In a first importance calculation technique, the importance of the conversation is calculated based on the ratio of images such as facial images of each speaker in camera data captured from the plurality of speakers S1, S2. In many cases, the user U directs the rear camera 206 toward a person deemed to be important. Thus, the importance calculation unit 111 acquires camera data from the rear camera 206 of the display terminal 2 as speaker objects for a plurality of speakers. Then, the importance calculation unit 111 calculates, as the importance, a high value for the conversation with a speaker having a large ratio of the facial images in the acquired camera data, and a low value for the conversation with a speaker having a small ratio of the facial images in the acquired camera data.

Second Importance Calculation Technique

In a second importance calculation technique, the importance of the conversation is calculated based on dialogue continuation. The dialogue continuation can be determined using the dialog breakdown level. The method for detecting the dialog breakdown level may include, for example, a method as disclosed in Michimasa Inaba, et. al., "Dialogue Breakdown Detection using Long Short-Term Memory Recurrent Neural Network", Japanese Society of Artificial Intelligence, SIG-SLUD-B502-13, pp. 57-60, 2015. The importance calculation unit 111 detects the dialog breakdown level based on the speech recognition result character string corresponding to the speech object of the user U and the speech recognition result character string or speech translation result character string corresponding to the speech object of each of the plurality of speakers S1, S2. Then, the importance calculation unit 111 calculates, as the importance, a high value for the conversation of the speaker having a low dialog breakdown level, and a low value for the conversation of the speaker having a high dialog breakdown level.

Third Importance Calculation Technique

In a third importance calculation technique, the importance of the conversation is calculated based on scores of the plurality of speakers S1, S2 previously scored using face recognition. When facial images of the user U and the speakers S1, S2 are accumulated in the face recognition DB 104A, the user U scores images of each person depending on the importance, and registers the person score with the face recognition DB 104A. FIG. 6 illustrates an example of contents in the face recognition DB. The importance calculation unit 111 acquires camera data from the rear camera 206 of the display terminal 2 as speaker objects for a plurality of speakers. With reference to the face recognition DB 104A, the importance calculation unit 111 performs face authentication of persons in the acquired camera data. The importance calculation unit 111 calculates, as the importance, among persons registered with the face recognition DB 104A, a high value for the conversation with the authenticated person having a high person score, and a low value for the conversation with the authenticated person having a low person score registered with the face recognition DB.

The graphic creation unit 112 determines the display form of the result character string based on the result character string (annotation) output by the importance calculation unit 111 and the corresponding importance of the conversation, and generates a displayed image (display result graphic data) including a character string image that is display information on the annotation having the display form. The display form may be a display position of the character string image in the displayed image, or may be some character enhancement such as character color, character size, character thickness, flashing, and decoration. The graphic creation unit 112 outputs the generated display result graphic data to the graphic return unit 302. As described above, the graphic return unit 302 transmits the display result graphic data to the display terminal 2 and causes the front display 201 or the rear display 204 to display it. In this way, in the display form corresponding to the importance of the conversation with the speakers S1, S2, the speech recognition result character strings or translation result character strings for the speech of the speakers S1, S2 are displayed on the display screen of the front display 201.

The operation of the information presentation system having the configuration described above will be described below in detail. Here, the case where the display terminal 2 presents the translation result character string to the user U will be described as an example.

Operation according to First Importance Calculation Technique

Figure 7A:
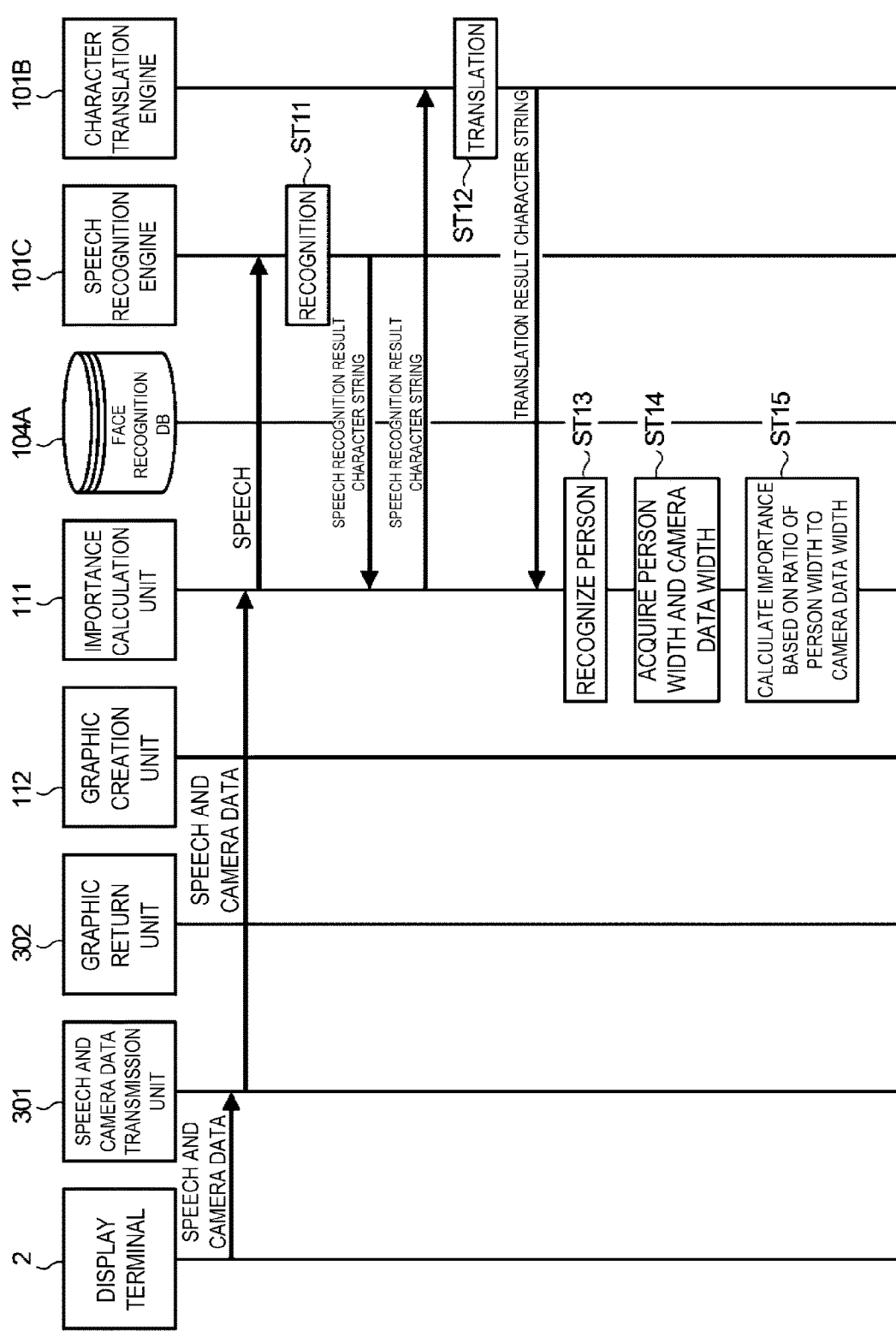
FIG. 7A is a view illustrating a first portion of a series of sequence views of the operation of the information presentation system when performing a first importance calculation technique.
Figure 7B:
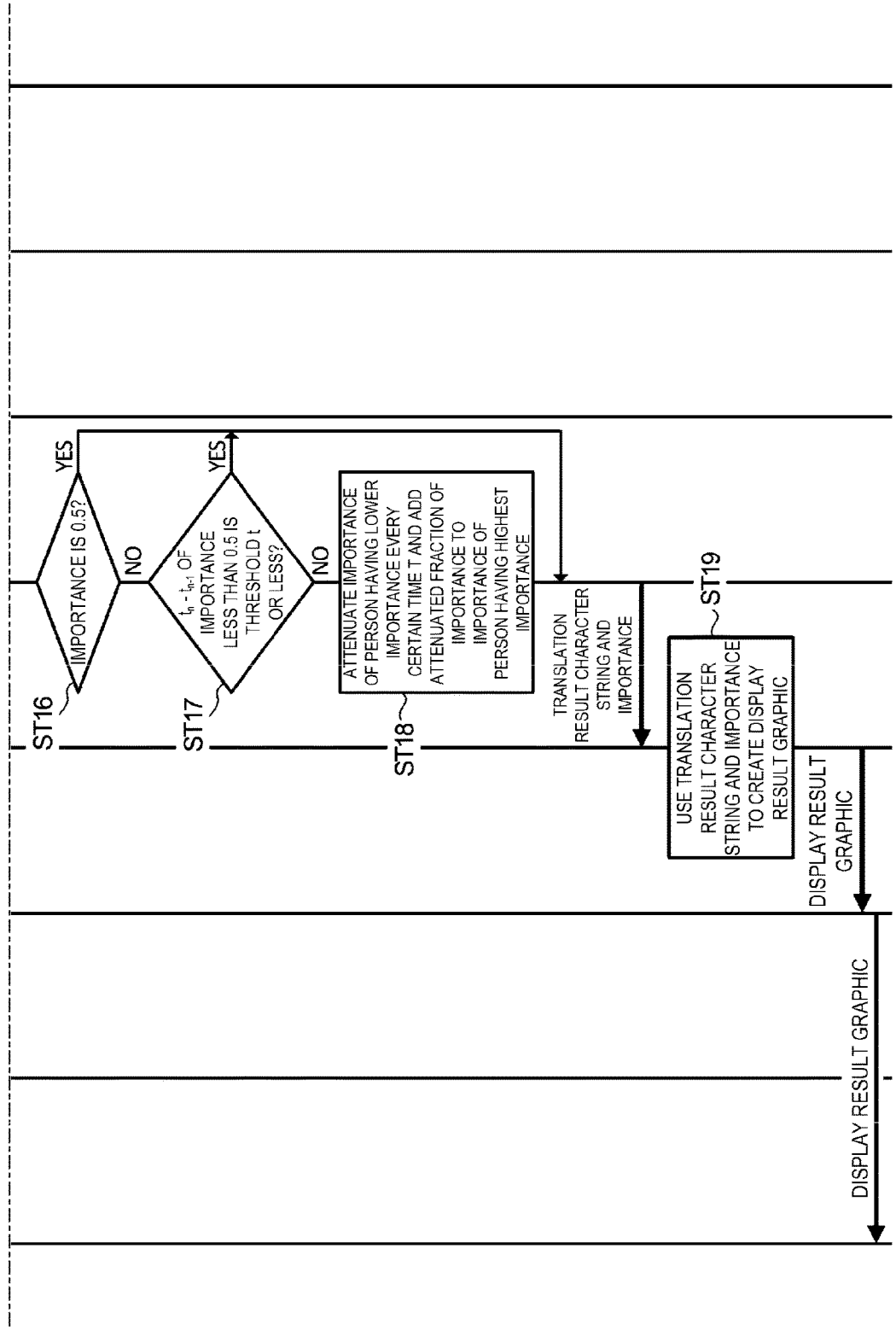
FIG. 7B is a view illustrating a second portion of the series of sequence views of the operation of the information presentation system when performing the first importance calculation technique.

FIGS. 7A and 7B are a series of sequence views illustrating the operation of the information presentation system when performing the first importance calculation technique.

For example, when the speech of at least one of the speakers S1 and S2 is acquired at the rear stereo microphone 205 of the display terminal 2, the speech and camera data transmission unit 301 transmits the speech along with camera data (images) acquired by the rear camera 206 from the display terminal 2 to the importance calculation unit 111 of the user terminal 1.

The importance calculation unit 111 outputs the received speech object to the speech recognition engine 101B. The speech recognition engine 101B performs speech recognition for the input speech object (Step ST11). The speech recognition engine 101B outputs the recognized speech recognition result character string as an annotation to the importance calculation unit 111. The importance calculation unit 111 causes the speech recognition result character string to be stored in a speech recognition result character string storage area per person (not illustrated) for each person, which is secured in the RAM 103 or the NVM 104, along with the current time.

The importance calculation unit 111 outputs the speech recognition result character string as the character string object to be translated to the character translation engine 101C. The character translation engine 101C translates the input character string object into a native language of the user U or a specified language (Step ST12). The character translation engine 101C outputs the translated translation result character string as an annotation to the importance calculation unit 111. The importance calculation unit 111 causes the translation result character string to be stored in a translation result character string storage area per person (not illustrated), which is secured in the RAM 103 or the NVM 104, along with the current time.

Figure 8A:
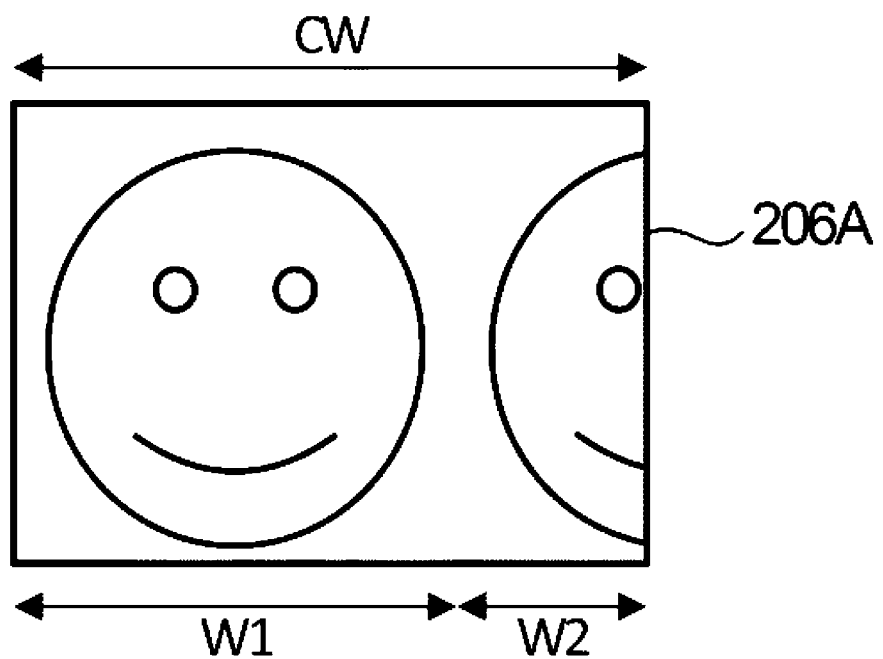
FIG. 8A is a view illustrating an example of the relation between a camera data width and a person width.
Figure 8B:
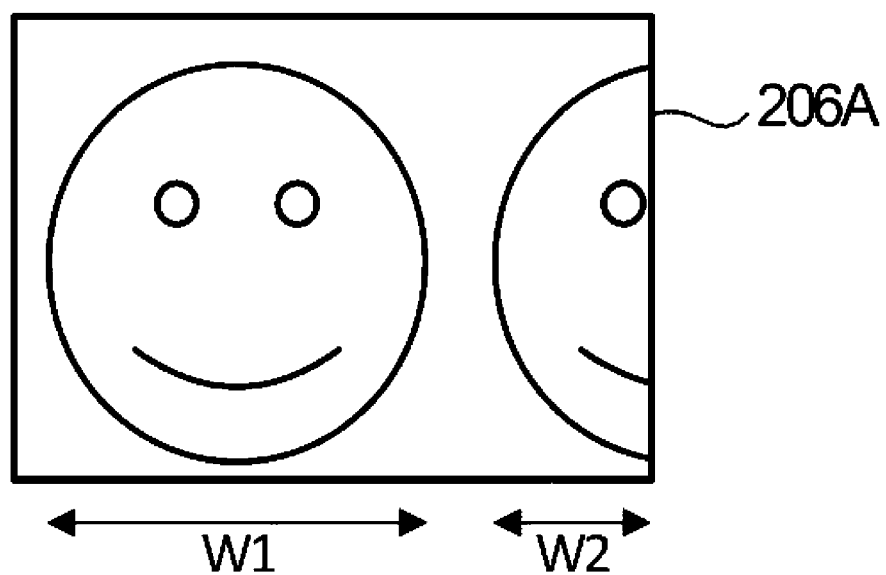
FIG. 8B is a view illustrating another example of the relationship between the camera data width and the person width.

The importance calculation unit 111 calculates the importance of the conversation between the user U and each of the speakers S1, S2 based on the ratio of the facial images of each speaker in the camera data captured from the plurality of speakers S1, S2. In other words, the importance calculation unit 111 first identifies the area occupied by the person by recognizing the person from the camera data acquired by the rear camera 206 of the display terminal 2 (Step ST13). This person recognition is a common technique utilized to focus on the face of a person in a camera. Next, the importance calculation unit 111 acquires a camera data width and each person width from the above-mentioned camera data (Step ST14). FIG. 8A is a view illustrating an example of the relationship between the camera data width and the person width in camera data 206A. In this example, a camera data width CW is the number of pixels of the camera data 206A in the lateral direction, and person widths W1, W2 are the number of lateral pixels from a midpoint between adjacent persons to an end of the camera data 206A. FIG. 8B is a view illustrating another example of the relation between the camera data width and the person width in the camera data 206A. In this example, the person widths W1, W2 each are the maximum number of pixels of each person in the lateral direction, and the camera data width CW may be the total value (W1+W2) of the number of pixels of the person width. The importance calculation unit 111 calculates the importance of the conversation based on the ratio of the person width to the camera data width and stores the calculation result in the score table 103A (Step ST15). FIG. 9 is a view illustrating an example of contents stored in the score table 103A, which are updated each time. The importance of the conversation is calculated based on the person width (W1 or W2) of the concerned person/camera data width (CW). That is, the importance of the conversation is 1.0 or less and 0.0 or more, and becomes higher toward "1.0".

The importance calculation unit 111 determines whether the calculated importance of the conversation is "0.5" (Step ST16). When the importance of the conversation is "0.5", that is, the two speakers S1, S2 have the same importance of the conversation, the importance calculation unit 111 outputs the translation result character strings, which are acquired annotations, and the calculated importance of the conversation to the graphic creation unit 112.

In contrast, when the importance of the conversation is not "0.5", that is, the importance of the conversation with either speaker is higher, the importance calculation unit 111 determines whether or not there is no speech from a person of low importance, that is, importance less than "0.5" beyond a time threshold t. That is, given that the current time is $t_n$ and a previous speech time of the concerned person is $t_{n-1}$, it is determined whether a difference in time $(t_n-t_{n-1})$ is the time threshold t or less (Step ST17). The previous speech time $t_{n-1}$ can be acquired from the translation result character string storage area per person of the concerned person stored in the RAM 103 or the NVM 104. When the importance "0.5" of $t_n-t_{n-1}$ is the time threshold t or less, that is, a time to have a conversation with a person of the importance "0.5" does not exceed the time threshold t, the importance calculation unit 111 outputs the translation result character strings, which are acquired annotations, and the calculated importance of the conversation to the graphic creation unit 112.

On the other hand, when the importance "0.5" of $t_n-t_{n-1}$ exceeds the time threshold t, that is, the time to have a conversation with the person of the importance "0.5" or less does exceeds the time threshold t, the importance calculation unit 111 determines that the importance of the conversation with the concerned person is low. Thus, the importance calculation unit 111 attenuates the importance of the person having a lower importance from the importance stored in the score table 103A every certain time, and adds the attenuated fraction of importance to an importance of the person having the highest importance, here, a person having a higher importance because the two speakers are present (Step ST18). Then, the importance calculation unit 111 outputs the translation result character strings, which are acquired annotations, and the updated importance of the conversation to the graphic creation unit 112.

Figure 10A:
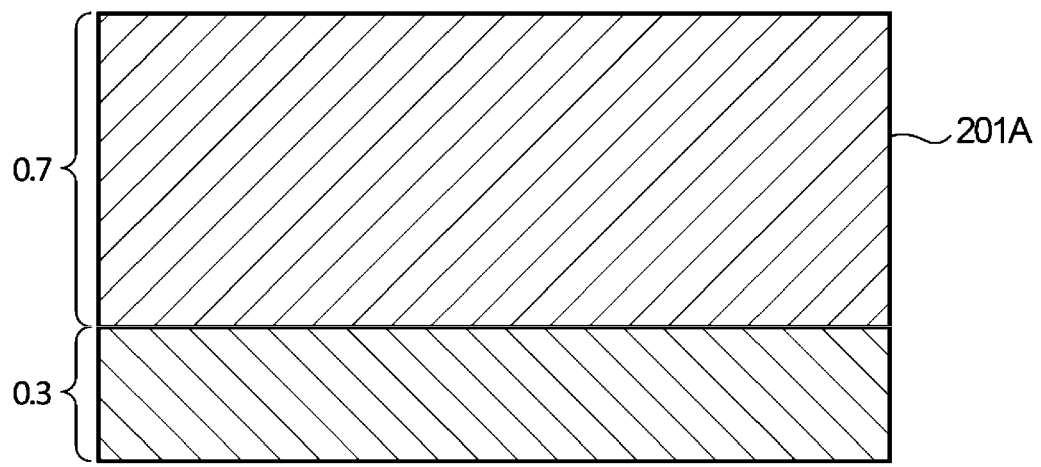
FIG. 10A is a view for describing an example of a ratio of a display area based on the importance of the conversation.

The graphic creation unit 112 determines the display form of the translation result character strings based on the translation result character strings and the importance of the conversation that are output from the importance calculation unit 111, and generates a displayed image (display result graphic data) including a character string image that is display information on the annotation having the display form (Step ST19). For example, given that the display form is the display position of the character string image, the graphic creation unit 112 determines the position of the translation result character strings in the displayed image displayed on the front display 201 or the rear display 204 of the display terminal 2 based on the importance of the conversation. In other words, the graphic creation unit 112 determines, in the displayed image displayed on the front display 201 of the display terminal 2, a ratio of an area where the translation result character string of the speaker S1 is displayed and an area where the translation result character string of the speaker S2 is displayed, based on the importance of the conversation. FIG. 10A is a view for describing an example of the ratio of the display areas based on the importance of the conversation, which corresponds to contents stored in the score table 103A illustrated in FIG. 9. As illustrated in FIG. 9, assuming that the importance of the conversation is 0.7 vs. 0.3, the graphic creation unit 112 determines to vertically divide the display area in a displayed image 201A into an area for a person 1 (for example, the speaker S1) and an area for a person 2 (for example, the speaker S2) with a ratio of 0.7:0.3, as illustrated in FIG. 10A.

Figure 10B:
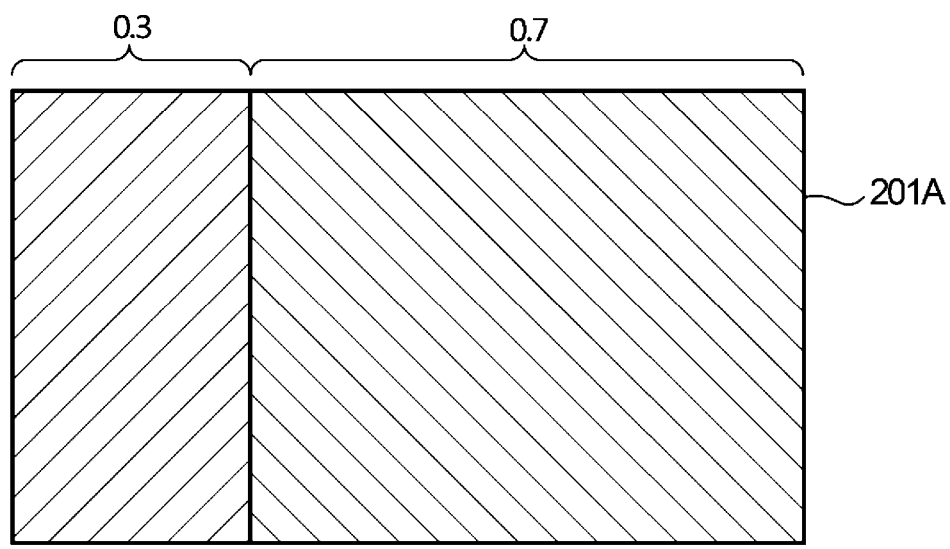
FIG. 10B is a view illustrating another example of the ratio of the display area based on the importance of the conversation.

FIG. 10B is a view for describing another example of the ratio of the display area based on the importance of the conversation. This example illustrates the case where the graphic creation unit 112 determines to horizontally divide the display area of the displayed image 201A into 0.7 v.s. 0.3. In this way, the display position of the translation result character string for each speaker is determined independently of the positional relation between the speakers in the camera data.

The graphic creation unit 112 generates the display result graphic data, which is a displayed image in which each translation result character string is arranged at the position thus determined. At this time, characters in the translation result character string of each speaker may be subject to some enhancement, such as character color, character size, character thickness, flashing, decoration, and the like. The decoration includes adding a window frame surrounding the character string, an icon corresponding to the importance, and the like.

In addition, the display form may be only character enhancement instead of the display position of the character string image. That is, the translation result character string may be disposed in spoken order, and the importance of the conversation may be identified by character enhancement.

The graphic creation unit 112 outputs the generated display result graphic data to the graphic return unit 302.

The graphic return unit 302 transmits the display result graphic data to the display terminal 2 and causes the front display 201 to display the display. In this way, the front display 201 displays translation result character strings corresponding to the speech of the speakers S1, S2 in the display form depending on the importance of the conversation with the speakers S1, S2.

In addition, when speech of the user U is acquired at the front stereo microphone 202 of the display terminal 2, the speech and camera data transmission unit 301 transmits from the display terminal 2 to the speech to the importance calculation unit 111 of the user terminal 1. At this time, the speech and camera data transmission unit 301 may also transmit the camera data (image) acquired by the front camera 208 from the display terminal 2 to the importance calculation unit 111 of the user terminal 1.

The importance calculation unit 111 outputs the received speech object to the speech recognition engine 101B, acquires a speech recognition result character string as an annotation from the speech recognition engine 101B, and stores the speech recognition result character string along with the current time in the speech recognition result character string storage area per person secured in the RAM 103 or the NVM 104.

The importance calculation unit 111 outputs the speech recognition result character string to the character translation engine 101C, acquires the translation result character string as an annotation from the character translation engine 101C, and stores the translation result character string along with the current time in the translation result character string storage area per person secured in the RAM 103 or the NVM 104.

For speech of the user U, the importance calculation unit 111 skips processing in Steps ST14 to ST18, sets the importance of the conversation to "1.0", and outputs the translation result character string and the importance of "1.0" to the graphic creation unit 112.

The graphic creation unit 112 determines the display form of the translation result character strings based on the translation result character strings and the importance of the conversation that are output from the importance calculation unit 111, and generates a displayed image (display result graphic data) including a character string image that is display information on the annotation having the display form (Step ST19). When the importance is "1.0", that is, when the translation result character string corresponds to the user U, the graphic creation unit 112 determines to use the entire display area of the displayed image without any division. The graphic creation unit 112 generates the display result graphic data, which is a displayed image in which each translation result character string is arranged at the position thus determined. At this time, characters in the translation result character string of each speaker may be subject to some enhancement such as character color, character size, character thickness, flashing, decoration, and the like. The graphic creation unit 112 outputs the generated display result graphic data to the graphic return unit 302.

The graphic return unit 302 transmits the display result graphic data to the display terminal 2 and causes the rear display 204 to display the display result graphic data. This causes the rear display 204 to display the translation result character string corresponding to the speech of the user U.

Figure 11A:
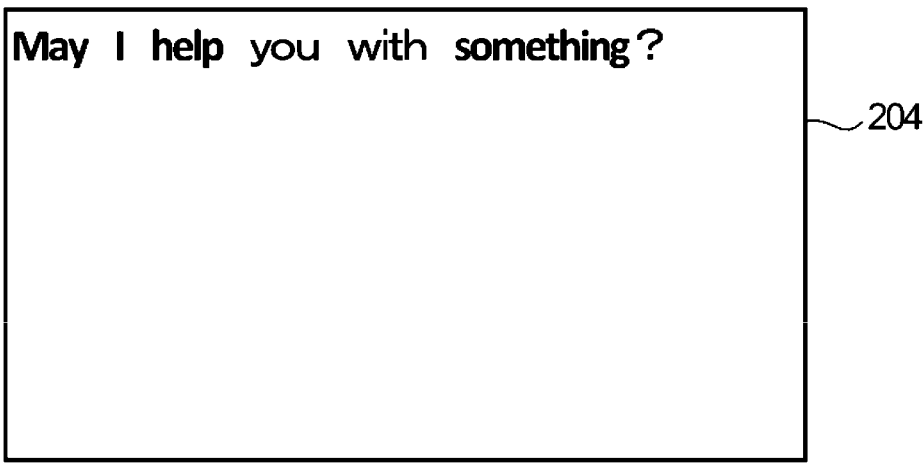
FIG. 11A is a view illustrating a display example of a rear display of the display terminal.
Figure 11B:
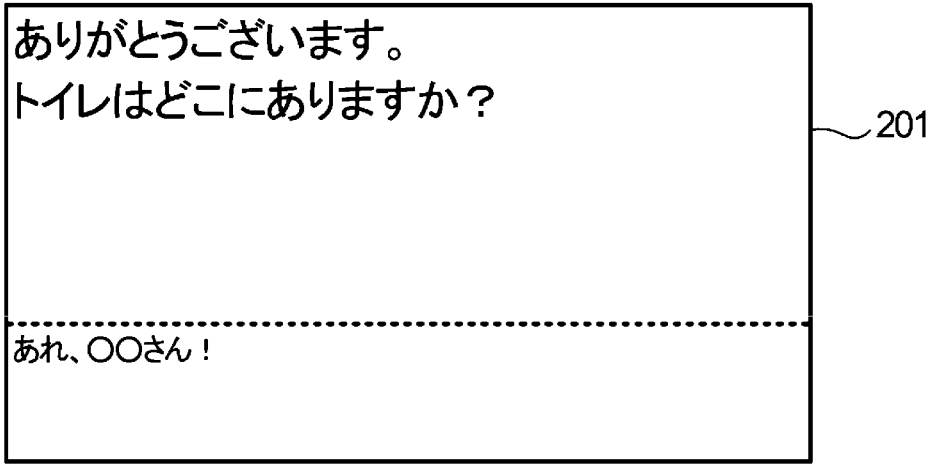
FIG. 11B is a view illustrating a display example of a front display of the display terminal.

FIG. 11A is a view illustrating a display example of the rear display 204 of the display terminal 2, and FIG. 11B is a view illustrating a display example of the front display 201 of the display terminal 2. When the user U speaks "何かお困りですか" in Japanese with the display terminal 2 oriented toward the two speakers S1, S2 as illustrated in FIG. 1, "May I help you with something?" that is an English translation is displayed on the rear display 204 of the display terminal 2 as illustrated in FIG. 11A. In response to this, it is assumed that the speaker S1 determined to occupy a large width in camera data and be a high priority in conversation speaks "Thank you. Where is the restroom?", and the speaker S2 determined to be a low priority happens to be acquainted with the speaker S1 and cries out "Oh, Mr. xx!". In such a case, as illustrated in FIG. 11B, the front display 201 of the display terminal 2 displays the translation result character string in Japanese in the display form corresponding to the importance. That is, "ありがとうござ います.トイレはどこですか" is displayed with large characters in the top of the display screen of the front display 201, and "あれ、○○さん" is displayed with small characters in the bottom of the display screen. Note that in FIG. 11B, the display area is partitioned by a dashed line to clearly indicate the distinction, but the dashed line may not be displayed. By the time the translation result character strings corresponding to the spoken contents of the speakers S1, S2 are displayed, the front display 201 may display the speech recognition result character string indicating the spoken contents of the user U.

As explained in above Step ST17 and Step ST18, when there is no speech of a person having a low importance beyond the time threshold t, the importance calculation unit 111 attenuates the importance having a lower important person every every certain time, and adds the attenuated fraction of importance to an importance of the importance of a person having a higher importance. Thus, when having a conversation with a plurality of persons, the annotation about the speech of the speaker having a lower importance, here, the translation result character string is no longer displayed on the screen of the front display 201.

When three or more speakers are present, the "person having a lower importance" may be a person having the lowest importance, or all persons other than a person having the highest importance. In the former case, the ratios of the annotations about speech displayed on the screen are decreased in the order from the person having a low importance among three or more speakers and finally, the annotations are no longer displayed. Once the annotation of the person having the lowest importance is no longer displayed, the speaker having the second lowest importance becomes the person having the lowest importance.

Operation according to Second Importance Calculation Technique

Figure 12:
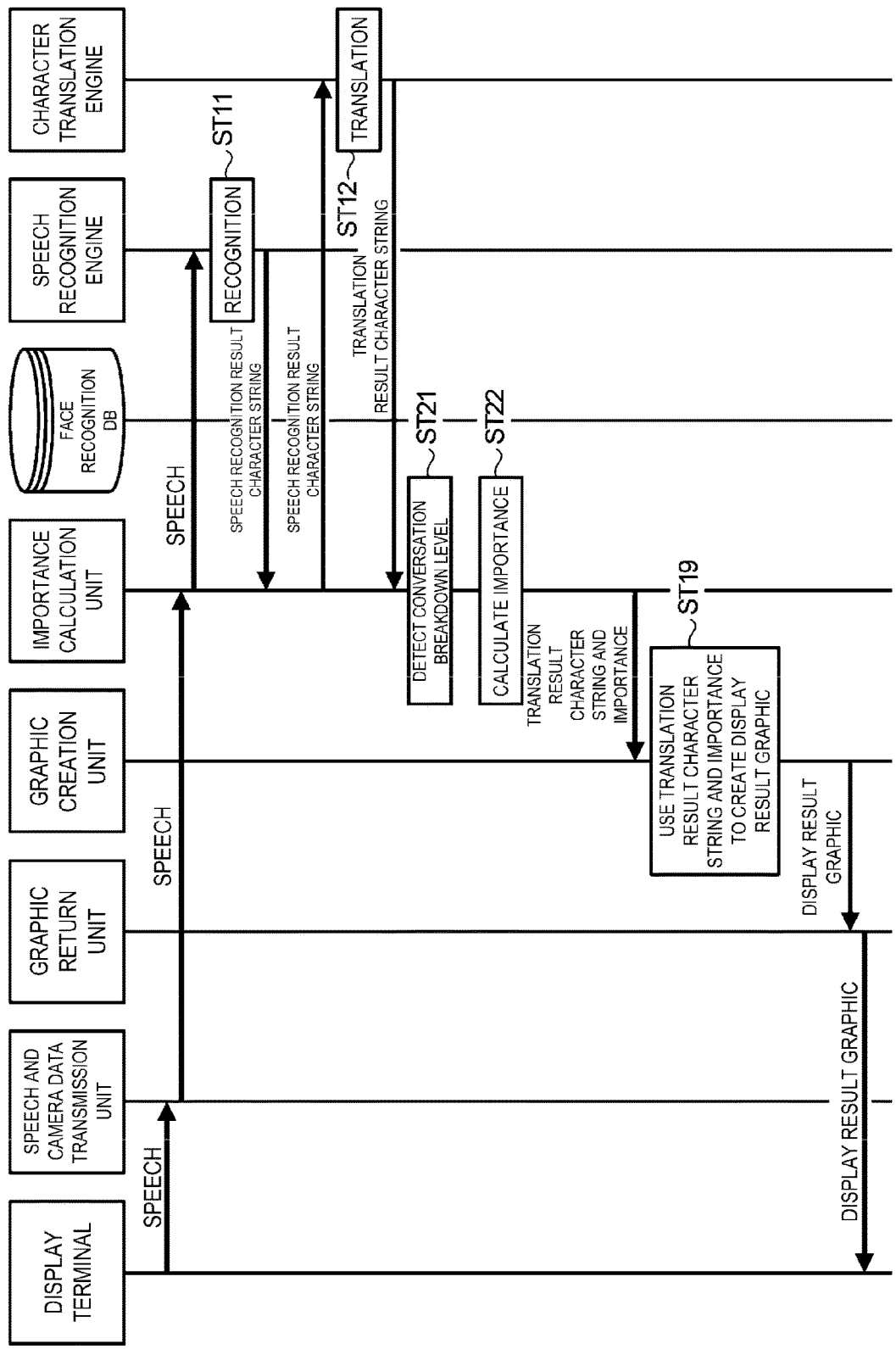
FIG. 12 is a sequence view illustrating the operation of the information presentation system when performing a second importance calculation technique.

FIG. 12 is a sequence view illustrating the operation of the information presentation system when performing a second importance calculation technique.

As with the first importance calculation technique, the importance calculation unit 111 of the user terminal 1 acquires the speech recognition result character string as the annotation from the speech recognition engine 101B, and acquires the translation result character string as the annotation from the character translation engine 101C. The speech recognition result character strings and the translation result character strings of each of the user U and the speakers S1, S2 are accumulated in the speech recognition result character string storage area per person and the translation result character string storage area person, which are secured in the RAM 103 or the NVM 104.

The importance calculation unit 111 detects the conversation breakdown level from the accumulated speech recognition result character strings of the user U and the accumulated translation result character strings of the speakers S1, S2 (Step ST21). The importance calculation unit 111 calculates the importance of the conversation based on the detected conversation breakdown level and stores the calculation result in the score table 103A (Step ST22). The importance of the conversation is calculated by "1—dialog breakdown level". The importance of the conversation is 1.0 or less and 0.0 or more, and becomes higher toward "1.0". The importance calculation unit 111 outputs the translation result character strings, which are acquired annotations, and the calculated importance of the conversation to the graphic creation unit 112. For speech of the user U, the importance calculation unit 111 skips processing in Steps ST21 and ST22, sets the importance of the conversation to "1.0", and outputs the translation result character string and the importance of "1.0" to the graphic creation unit 112.

As with the first importance calculation technique, the graphic creation unit 112 generates the displayed image (display result graphic data) and outputs the generated display result graphic data to the graphic return unit 302. The graphic return unit 302 transmits the display result graphic data to the display terminal 2, causes the front display 201 to display the translation result character strings corresponding to the speech of the speakers S1, S2, and causes the rear display 204 to display the translation result character string corresponding to the speech of the user U.

Operation according to Third Importance Calculation Technique

Figure 13:
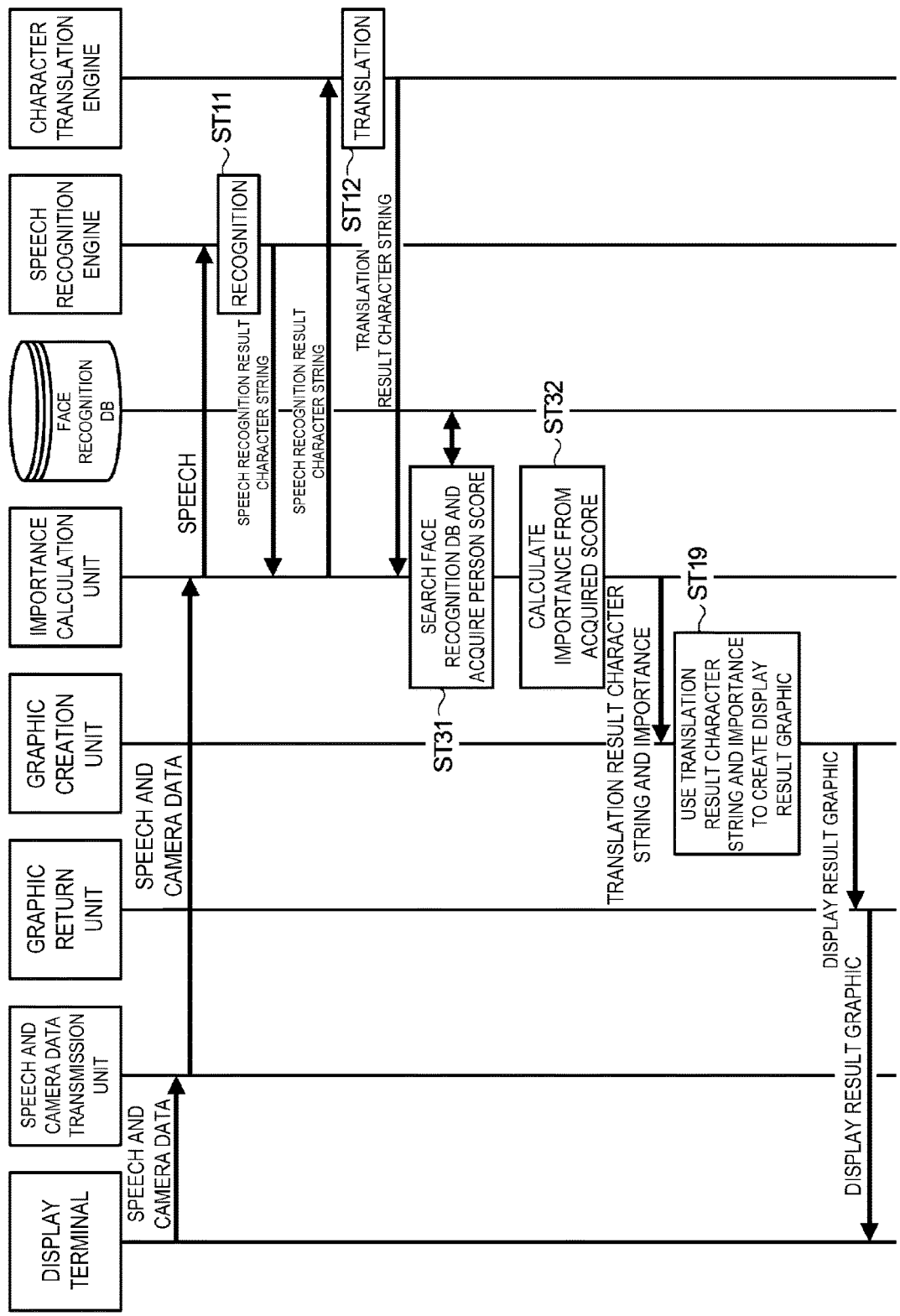
FIG. 13 is a sequence view illustrating the operation of the information presentation system when performing a third importance calculation technique.

FIG. 13 is a sequence view illustrating the operation of the information presentation system when performing a third importance calculation technique.

As with the first importance calculation technique, the importance calculation unit 111 of the user terminal 1 acquires the speech recognition result character string as the annotation from the speech recognition engine 101B, and acquires the translation result character string as the annotation from the character translation engine 101C. The speech recognition result character strings and the translation result character strings of each of the user U and the speakers S1, S2 are accumulated in the speech recognition result character string storage area per person and the translation result character string storage area person, which are secured in the RAM 103 or the NVM 104.

The importance calculation unit 111 searches the face recognition DB 104A for camera data to perform face authentication, identifies speakers captured in the camera data, and acquires person scores of the persons (Step ST31). The importance calculation unit 111 calculates the importance of the conversation based on the acquired person scores, and stores the calculation result in the score table 103A (Step ST32). The importance of the conversation is calculated by "a person score of the concerned person in the camera data/a total of person scores of all persons in the camera data". For example, in the example illustrated in FIG. 6, when the person A and the person B are captured in the camera data, the importance of the person A is calculated as "30/(30+50)=0.375". The importance of the conversation is 1.0 or less and 0.0 or more, and becomes higher toward "1.0". The importance calculation unit 111 outputs the translation result character strings, which are acquired annotations, and the calculated importance of the conversation to the graphic creation unit 112. For speech of the user U, registering the person score "100" with the facial image of the user U results in "100/100=1.0". Alternatively, for the speech of the user U, the importance calculation unit 111 may skip the processes in Steps ST31 and ST32 and set the importance of the conversation to a predetermined value "1.0."

As with the first importance calculation technique, the graphic creation unit 112 generates the displayed image (display result graphic data) and outputs the generated display result graphic data to the graphic return unit 302. The graphic return unit 302 transmits the display result graphic data to the display terminal 2, causes the front display 201 to display the translation result character strings corresponding to the speech of the speakers S1, S2, and causes the rear display 204 to display the translation result character string corresponding to the speech of the user U.

Operation according to Fourth Importance Calculation Technique

The above-mentioned first, second, and third importance calculation techniques may be used alone, but may be used in combination. That is, the importance calculation techniques may utilize the following combination. A first combination is a combination of the first importance calculation technique and the second importance calculation technique. A second combination is a combination of the first importance calculation technique and the third importance calculation technique. A third combination is a combination of the second importance calculation technique and the third importance calculation technique. A fourth combination is a combination of the first, second and third importance calculation techniques. Here, the combination of the first, second, and third importance calculation techniques is described as a fourth importance calculation technique.

Figure 14A:
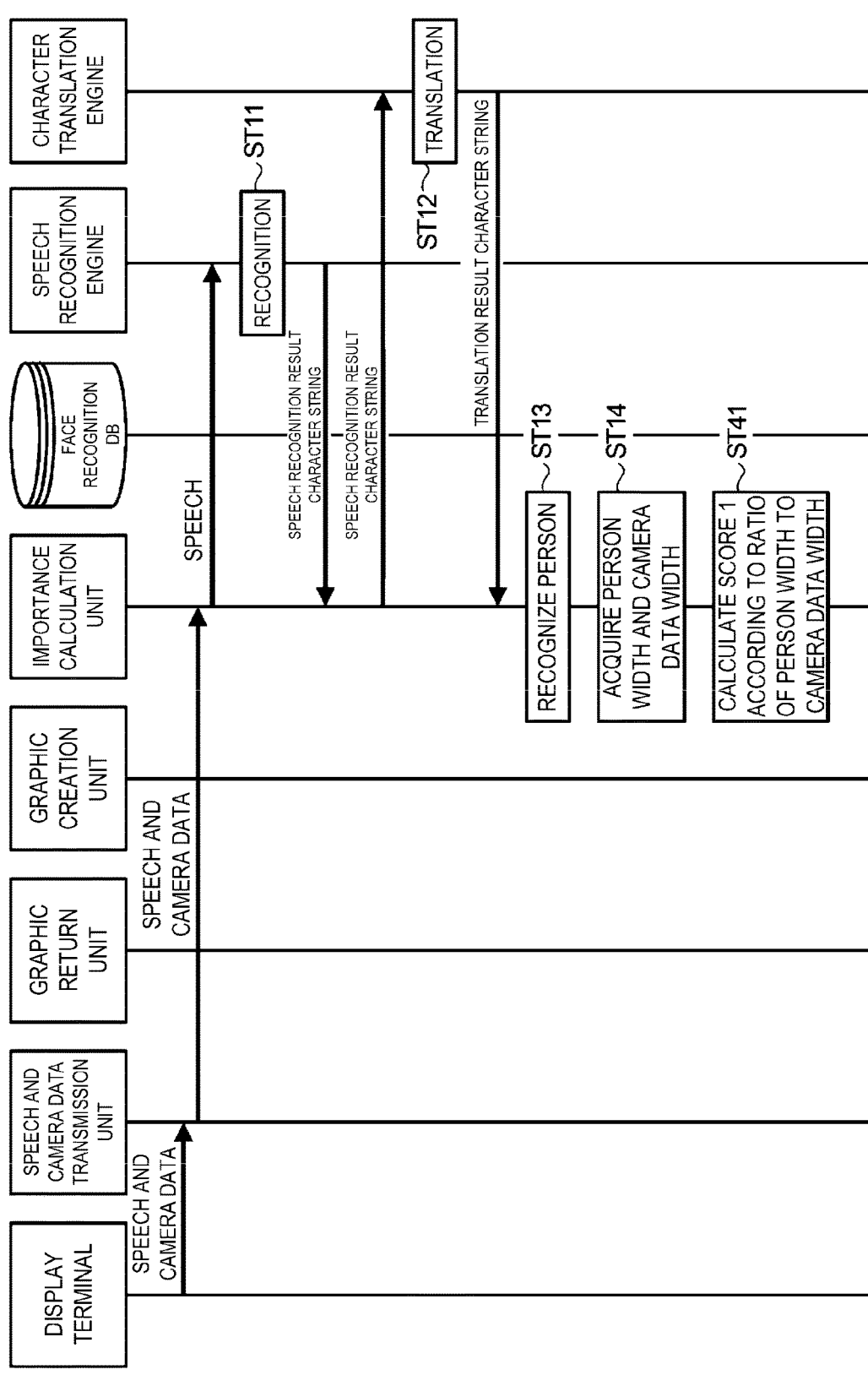
FIG. 14A is a view illustrating a first portion of a series of sequence views of the operation of the information presentation system when performing a fourth importance calculation technique.
Figure 14B:
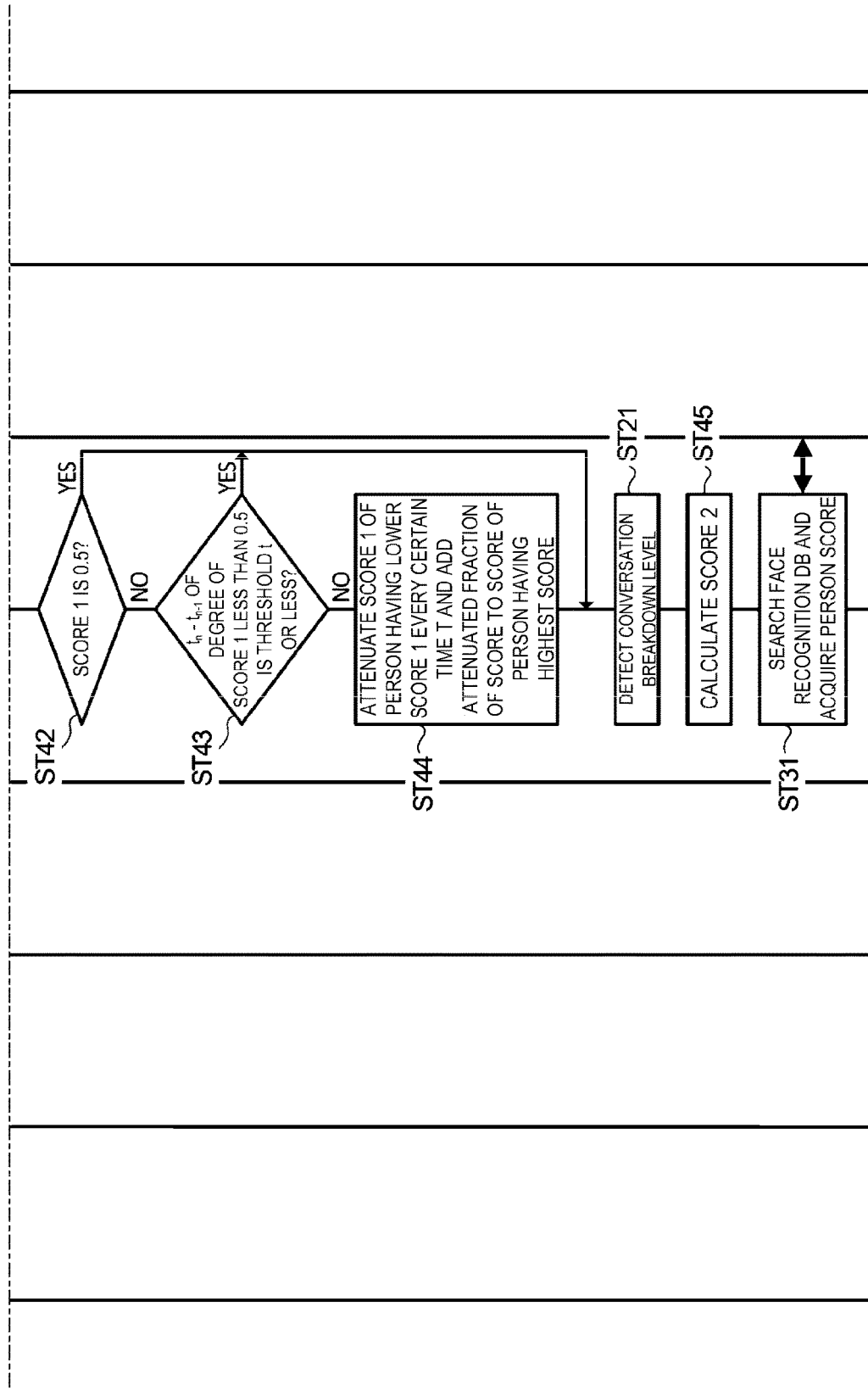
FIG. 14B is a view illustrating a second portion of the series of sequence views of the operation of the information presentation system when performing the fourth importance calculation technique.
Figure 14C:
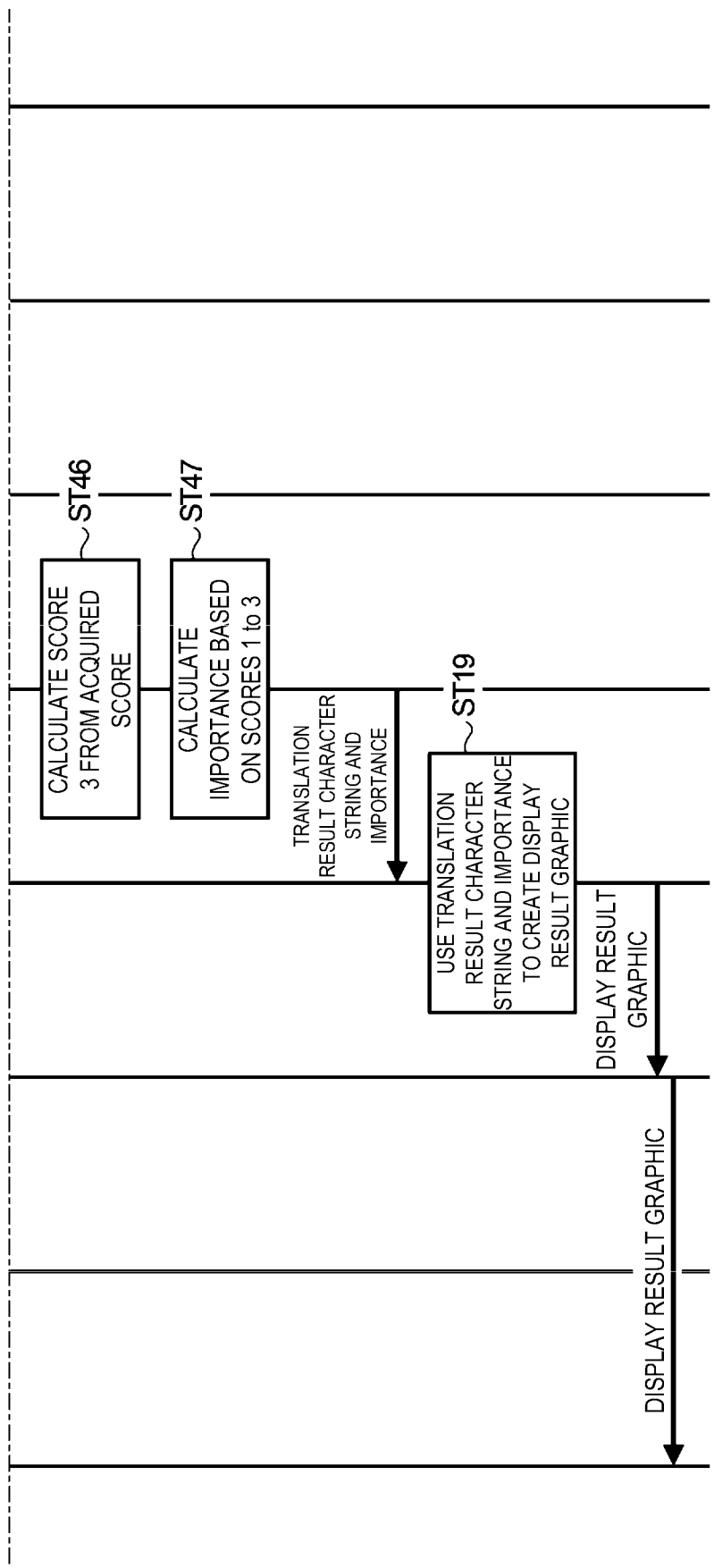
FIG. 14C is a view illustrating a third portion of the sequence view illustrating the operation of the information presentation system when performing the fourth importance calculation technique.

FIGS. 14A, 14B, and 14C are a series of sequence views illustrating the operation of the information presentation system when performing the fourth importance calculation technique.

As with the first importance calculation technique, the importance calculation unit 111 of the user terminal 1 acquires the speech recognition result character string as the annotation from the speech recognition engine 101B, and acquires the translation result character string as the annotation from the character translation engine 101C. The speech recognition result character strings and the translation result character strings of each of the user U and the speakers S1, S2 are accumulated in the speech recognition result character string storage area per person and the translation result character string storage area person, which are secured in the RAM 103 or the NVM 104.

As with the first importance calculation technique, the importance calculation unit 111 identifies the area occupied by the person from the camera data by person recognition (Step ST13), and acquires the camera data width of the width of each person (Step ST14). Thereafter, the importance calculation unit 111 calculates a score 1 based on the ratio of the person width to the camera data width, and stores the calculation result in the score table 103A (Step ST41). This calculation of the score 1 is similar to the calculation of the importance of the conversation based on the ratio in the camera data when performing the first importance calculation technique. In other words, the processing in Step ST41 is to store the importance of the conversation calculated in the first importance calculation technique in the score table 103A as the score 1. FIG. 15 is a view illustrating an example of contents stored in the score table 103A. The score 1 is calculated by "person width of the concerned person (W1 or W2)/camera data width (CW)". This results in "1.0≥score 1≥0.0".

Then, the importance calculation unit 111 executes the processing in Steps ST16 to ST18 when using the first importance calculation technique, for the score 1 rather than the importance of the conversation. In other words, the importance calculation unit 111 determines whether or not the calculated score 1 is "0.5" (Step ST42). When the score 1 is "0.5", the importance calculation unit 111 proceeds to processing in Step ST21, which will be described later. When the score 1 is not "0.5", the importance calculation unit 111 determines whether or not there is no speech from a person having the score 1 less than "0.5" beyond the time threshold t. That is, given that the current time is $t_n$ and a previous speech time of the concerned person is $t_{n-1}$, it is determined whether a difference in time ($t_n - t_{n-1}$) is the time threshold t or less (Step ST43). When a time to have a conversation with the person having a score 1 less than "0.5" does not exceed the time threshold t, the importance calculation unit 111 proceeds processing in Step ST21, which will be described later. When the time to have a conversation with the person having a score 1 less than "0.5" exceeds the time threshold t, the importance calculation unit 111 attenuates the score of the person having a lower score 1 every certain time from the score 1 stored in the score table 103A. Then, the importance calculation unit 111 adds the attenuated fraction of score to the score 1 of the person having the highest score (Step ST44). Thereafter, the importance calculation unit 111 proceeds processing in Step ST21.

In Step ST21, as with the second importance calculation technique, the importance calculation unit 111 detects the conversation breakdown level from the accumulated speech recognition result character strings of the user U and translation result character strings of each of the speakers S1, S2. Then, the importance calculation unit 111 calculates a score 2 based on the detected conversation breakdown level, and stores the calculated result in the score table 103A (Step ST45) as illustrated in FIG. 15. This calculation of the score 2 is similar to the calculation of the importance of the conversation based on dialogue continuation utilizing the dialog breakdown level when using the second importance calculation technique. In other words, the processing in Step ST45 is to store the importance of the conversation calculated in the second importance calculation technique in the score table 103A as the score 2. The score 2 is calculated by "1—dialog breakdown level". This results in "1.0≥score 2≥0.0".

Next, as with the second importance calculation technique, the importance calculation unit 111 searches the face recognition DB 104A for camera data to perform face authentication, identifies speakers captured in the camera data, and acquires person scores of the persons (Step ST31). Thereafter, the importance calculation unit 111 calculates a score 3 based on the acquired scores, and stores the calculated result in the score table 103A (Step ST46) as illustrated in FIG. 15. This calculation of score 3 is similar to the calculation of the importance of the conversation based on the person scores using face authentication when using the third importance calculation technique. In other words, the processing in Step ST46 is to store the importance of the conversation calculated in the third importance calculation technique in the score table 103A as the score 3. The score 3 is calculated by "a person score of the concerned person in the camera data/a total of person scores of all persons in the camera data".

The importance calculation unit 111 calculates the importance of the conversation based on the score 1, score 2, and score 3 that are stored in the score table 103A (Step ST47). The importance of the conversation is calculated by "a total of scores of each person/a total of scores of all persons". For example, when the scores as illustrated in FIG. 15 are stored in the score table 103A, because the total of scores of the person 1 is "0.8+0.7+0.375=1.875" and the total of scores of the person 2 is "0.2+0.3+0.625=1.125", the importance of the conversation of the person 1 is calculated as "1.875/(1.875+1.125)=0.625". The importance of the conversation of the person 2 is calculated as "1.125/(1.875+1.125)=0.375".

The importance calculation unit 111 outputs the translation result character strings, which are acquired annotations, and the calculated importance of the conversation to the graphic creation unit 112. For speech of the user U, the importance calculation unit 111 skips the processing in Steps ST13 to ST47 and outputs the importance of the conversation, as a prescribed value "1.0", to the graphic creation unit 112.

Figure 16:
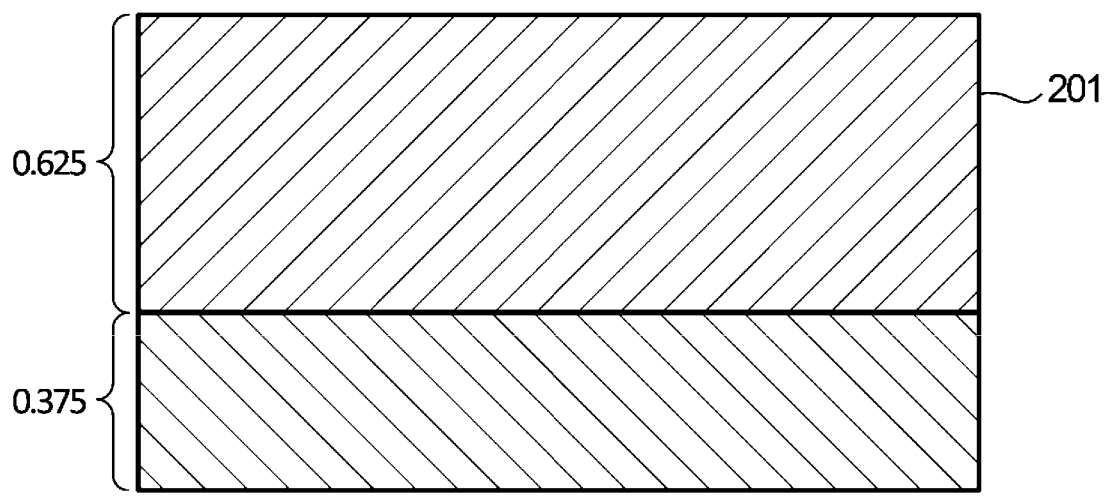
FIG. 16 is a view illustrating an example of a ratio of the display area based on the importance of the conversation corresponding to the example in FIG. 15.

As with the first importance calculation technique, the graphic creation unit 112 generates the displayed image (display result graphic data) and outputs the generated display result graphic data to the graphic return unit 302. The graphic return unit 302 transmits the display result graphic data to the display terminal 2, causes the front display 201 to display the translation result character strings corresponding to the speech of the speakers S1, S2, and causes the rear display 204 to display the translation result character string corresponding to the speech of the user U. FIG. 16 is a view for explaining an example of the ratio of the display area based on the importance of the conversation corresponding to the example in FIG. 15. By dividing the display screen using the ratio of the importance, the translation result character string of a person having a high importance is displayed large.

According to the first embodiment as described above, the importance calculation unit 111 receives a user object for one user U and a plurality of speaker objects for a plurality of speakers S1, S2 who have a conversation with the one user U, and a plurality of annotations with respect to each object generated for the respective objects. Then, the importance calculation unit 111 calculates the importance of the conversation between the user U and each of the plurality of speakers S1, S2 based on at least one of the plurality of speaker objects or the plurality of annotations. The graphic creation unit 112 determines a display form of each of the plurality of annotations generated for the plurality of speaker objects based on the importance of the conversation calculated by the importance calculation unit 111, and generates display information on the plurality of annotations having the display form. As a result, the display terminal 2 that displays the display information on the plurality of annotations generated by the graphic creation unit 112 can display the plurality of annotations in the display form depending on the importance of the conversation. Thus, the information presentation system including the display information generation device according to the first embodiment can intelligently present to the user which of the plurality of annotations is important.

Because the user terminal 1 is configured to calculate the importance of the conversation and generate display information on the plurality of annotations, the display terminal 2 does not need to perform complex processing. Thus, the display terminal 2 can be provided inexpensively.

Here, each of the plurality of speaker objects received by the importance calculation unit 111 includes a speech object about speech of each speaker transmitted from the display terminal 2, and the plurality of annotations received by the importance calculation unit 111 include the speech translation result character string acquired by translating the speech recognition result character string from the speech object acquired by the speech recognition engine 101B, by the character translation engine 101C. The display information generated by the graphic creation unit 112 is a character string image displayed on the display screen of the display terminal 2, and the display form includes at least one of the display position of the character string image in the display screen and character enhancement in character string image. Thus, the information presentation system including the display information generation device according to the first embodiment can provide the speech translation device that translates the spoken contents of the speakers S1, S2 and presents it to the user U.

In addition, the user object received by the importance calculation unit 111 includes the speech object about the speech of the user U, and the plurality of speaker objects received by the importance calculation unit 111 include at least one of the speech objects for the speech of the speakers or the speech objects for the speech of the speakers and the camera data object that captures the plurality of speakers S1, S2. The importance calculation unit 111 can calculate the importance of the conversation by one of the first to third importance calculation techniques or the fourth importance calculation technique in which the first to third importance calculation techniques are combined with each other in any combination.

The first importance calculation technique uses the ratio of an image of each of the speakers in the camera data object. Because it is not necessary to determine the contents of the conversation according to this technique, as compared to the first or third importance calculation technique, the processor 101 of the user terminal 1, which functions as the importance calculation unit 111, does not require high capability, enabling the use of the inexpensive user terminal 1.

The second importance calculating technique utilizes dialogue continuation utilizing dialog breakdown level detected from the speech recognition result character string corresponding to the user object, and at least one of the speech recognition result character string or the speech translation result character string that corresponds to each of the plurality of speaker objects. In this case, because the importance is calculated by determining contents of conversation, as compared to the case of using the first or third importance calculation technique, the importance can be calculated more correctly.

The third importance calculation technique utilizes the scores of the previously scored speakers S1, S2 using face recognition. In this case, since the user U previously specifies an important person, the importance of the conversation reflecting the intent of the user U intent can be calculated.

The fourth importance calculation technique is a combination of at least two of the first to third importance calculation techniques. This can improve the calculation accuracy of the importance.

In addition, since the importance calculation unit 111 and the graphic creation unit 112 are implemented by causing the the processor 101 of the user terminal 1 to execute the display information generation application 101A, tune-up and version-up of the importance calculation technique is possible, thereby appropriately improving the calculation accuracy of the importance. It is also possible to add a new importance calculation technique.

The dialog breakdown level in the second importance calculation technique may be detected by a server (not illustrated) provided on the network via the communication IF 107. With this configuration, even when the second importance calculation technique is used, the processor 101 of the user terminal 1, which functions as the importance calculation unit 111, does not require high capability, enabling the use of the inexpensive user terminal 1.

MODIFICATION EXAMPLES

Figure 17:
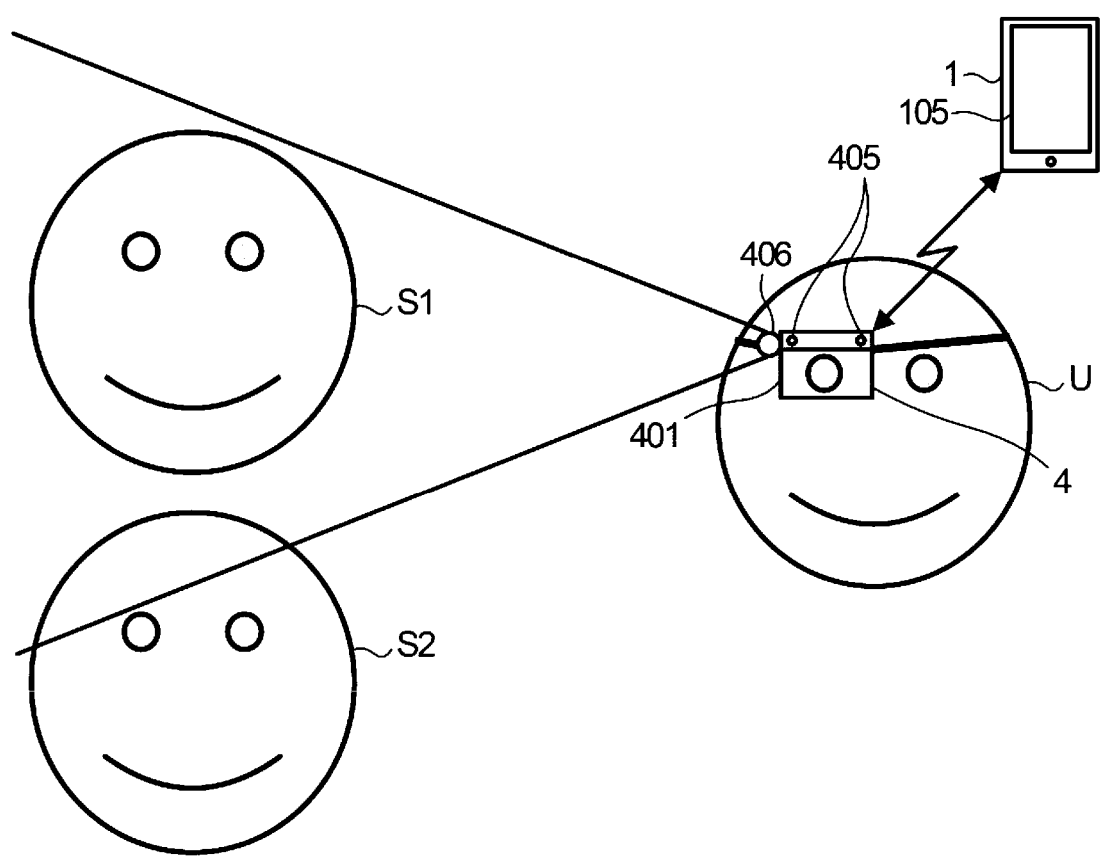
FIG. 17 is a schematic view illustrating a usage mode of an information presentation system according to a modification of the first embodiment.

FIG. 17 is a schematic view illustrating a usage form of an information presentation system according to a modification of the first embodiment. The display terminal 4 is provided in the form of a Head Mount Display (HMD) having a transmissive display 401 disposed in front of one eye of the user. Left and right microphones that configure a stereo microphone 405 for acquiring the speech of the plurality of speakers S1, S2, and a camera 406 for acquiring images of the speakers S1, S2 are disposed so as not to interfere with the field of view of the user U around the transmissive display 401.

Figure 18:
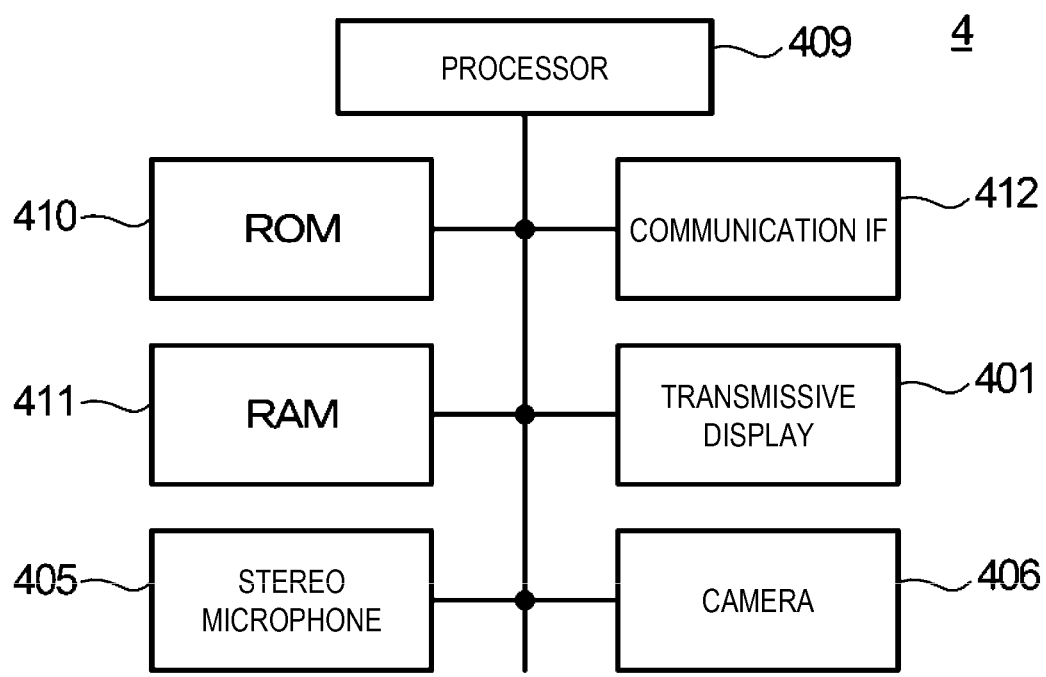
FIG. 18 is a block diagram of a display terminal.

FIG. 18 is a block diagram of the display terminal 4. The display terminal 4 includes a processor 409, a ROM 410, a RAM 411, a communication IF 412, and the like in addition to the components described above. In the information presentation system in this modification, the transmissive display 401 of the display terminal 4 presents the speech recognition result character string of conversation spoken by the speakers S1, S2, to the user with hearing impairment. Thus, the display terminal 4 omits the configuration for acquiring speech and image of the user and the configuration for presenting contents of speech of the user to the speakers S1, S2, from the configuration of the above-mentioned display terminal 2.

The configuration of the user terminal 1 is as illustrated in FIG. 4. Functionally, the character translation engine 101C may be omitted from the configuration illustrated in FIG. 5.

In the information presentation system in this modification, the importance calculation unit 111 utilizes the first importance calculation technique, the third importance calculation technique, or a combination thereof to calculate the importance of the conversation and output the calculated importance of the conversation and the speech recognition result character strings that are annotations to the graphic creation unit 112. Accordingly, the speech recognition result character strings of spoken contents of the speakers S1, S2 can be displayed on the transmissive display 401 in a display form depending on the importance of the conversation.

Note that the second importance calculation technique utilizing the dialog breakdown level can be implemented by acquiring speech of the user U with a microphone (not illustrated) of the user terminal 1.

According to the information presentation system in such variants, each of the plurality of speaker objects received by the importance calculation unit 111 includes a speech object about speech of each speaker transmitted from the display terminal 2, and the plurality of annotations received by the importance calculation unit 111 include the speech recognition result character string from the speech object acquired by the speech recognition engine 101B. Thus, the information presentation system in this modification can provide a hearing assistance device that presents spoken content of the speakers S1, S2 as character strings to the user U.

Second Embodiment

The first embodiment and the modified example have been described as an information presentation system including a user terminal 1 and a display terminal 2, but the functions can be configured as information presentation devices that are housed in a single housing.

Figure 19:
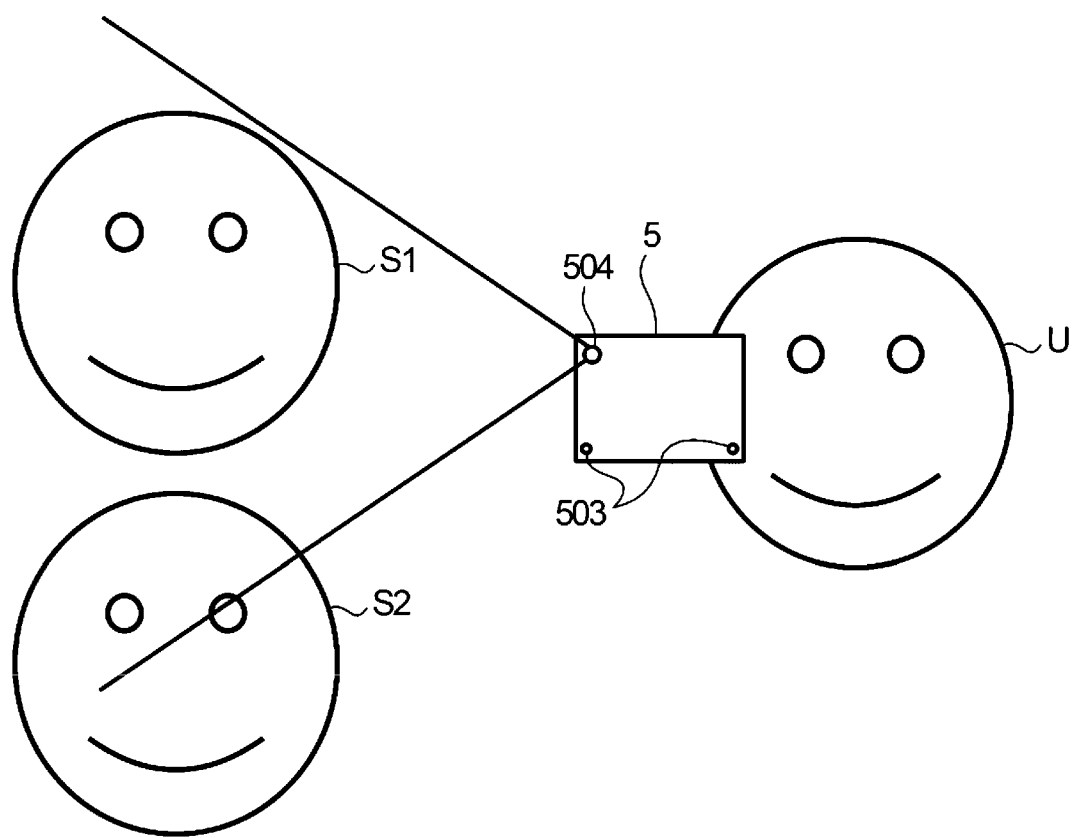
FIG. 19 is a schematic view illustrating a usage mode of an information presentation device including a display information generation device according to a second embodiment.
Figure 20A:
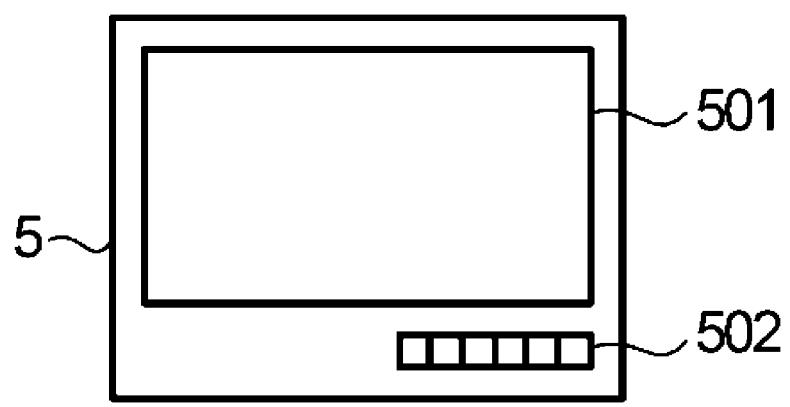
FIG. 20A is a front view of the information presentation device.
Figure 20B:
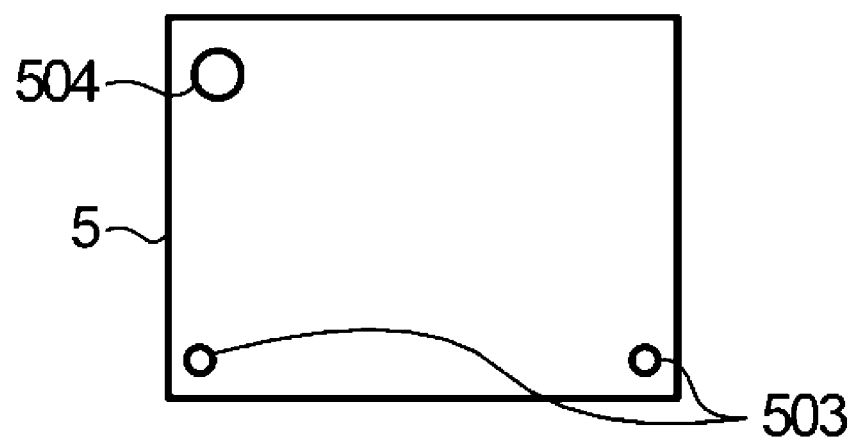
FIG. 20B is a rear view of the information presentation device.

FIG. 19 is a schematic view illustrating a usage mode of an information presentation device 5 including a display information generation device according to a second embodiment. FIG. 20A is a front view of the information presentation device 5, and FIG. 20B is a rear view of the information presentation device 5. The information presentation device 5 corresponds to a modification of the first embodiment. A display 501 and a keyboard 502 are disposed on the front face of the information presentation device 5. A stereo microphone 503 and a camera 504 are disposed on the rear face of the information presentation device 5.

Figure 21:
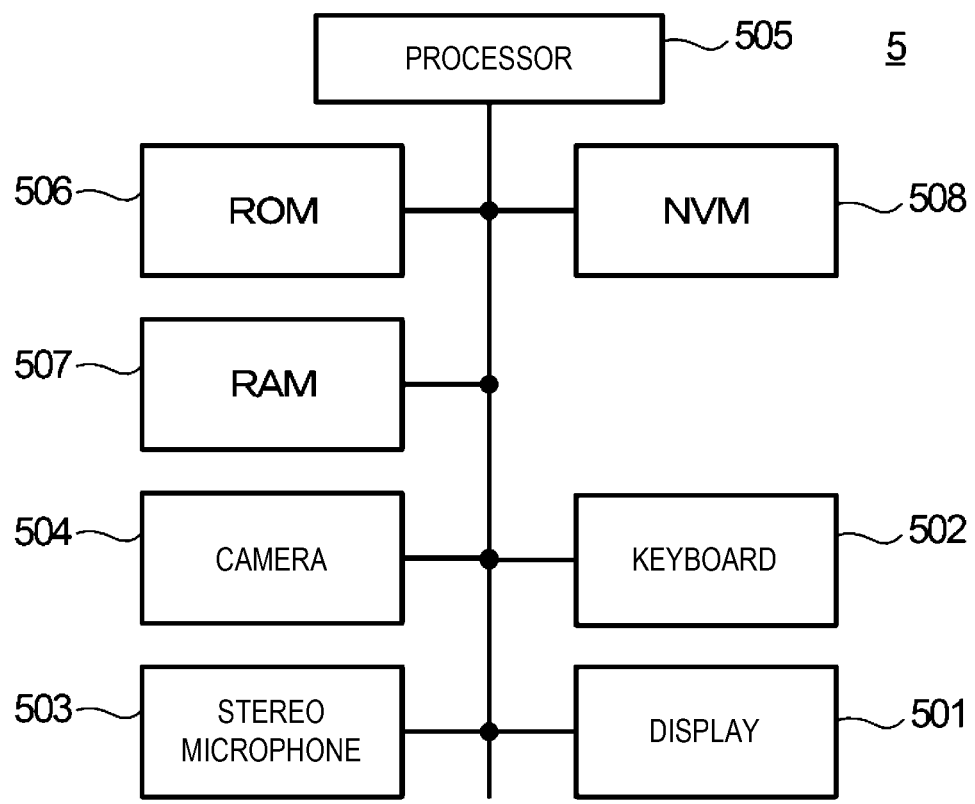
FIG. 21 is a block diagram of the information presentation device.

FIG. 21 is a block diagram of the information presentation device 5. The information presentation device 5 includes a processor 505, a ROM 506, a RAM 507, and an NVM 508 in addition to the components described above. The information presentation device 5 is unitary and thus, may not have a communication IF.

Figure 22:
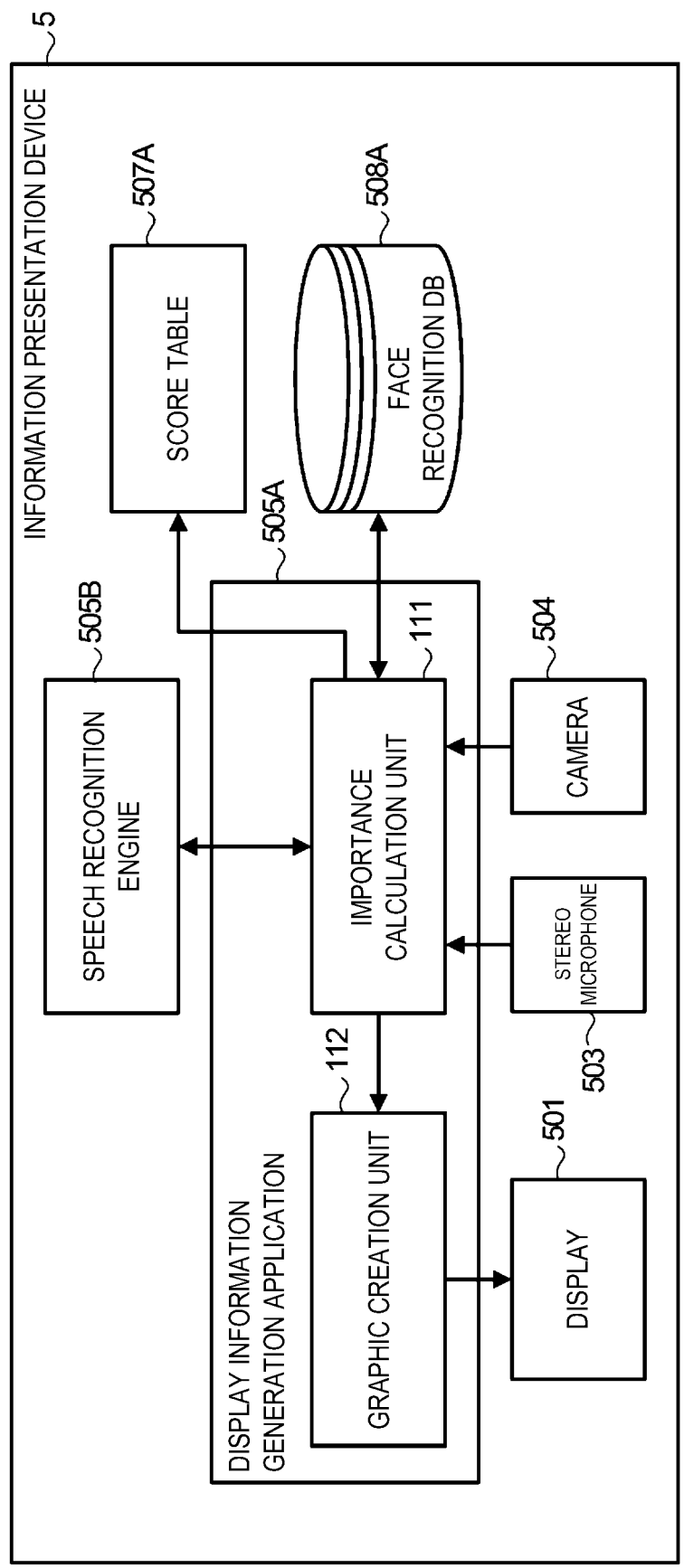
FIG. 22 is a functional configuration view of the information presentation device.

FIG. 22 is a functional configuration view of the information presentation device 5. A display information generation application 505A corresponds to the display information generation application 101A of the first embodiment, and provides the functions of the importance calculation unit 111 and the graphic creation unit 112. A speech object from a stereo microphone 503 and a camera data object from the camera 504 are output directly to the importance calculation unit 111. The graphic creation unit 112 outputs generated display result graphic data to the display 501 for display. A speech recognition engine 505B, a score table 507A, and a face recognition DB 508A are similar to the speech recognition engine 101B, the score table 103A, and the face recognition DB 104A in the first embodiment, respectively.

The information presentation device 5 is unitary and does not have the communication IF, but may have the communication IF. Including the communication IF allows the use of an external speech recognition engine.

In the information presentation device 5 with such configuration, the importance calculation unit 111 utilizes the first importance calculation technique, the second importance calculation technique, the third importance calculation technique, or a combination thereof to calculate the importance of the conversation and output the calculated importance of the conversation and the speech recognition result character strings that are annotations to the graphic creation unit 112. Accordingly, the speech recognition result character strings of spoken contents of the speakers S1, S2 can be displayed on the display 501 in a display form depending on the importance of the conversation.

The information presentation device 5 in the modification of the first embodiment has been described, but it goes without saying that a unitary information presentation device corresponding to the first embodiment for presenting information to the user U and the speakers S1, S2 can be configured in a similar manner.

The information presentation device 5 including the display information generation device according to the second embodiment can intelligently present which of a plurality of annotations is important to the user U having no user terminal 1.

Third Embodiment

Although the first embodiment and its modification, and the second embodiment describe the display information generation devices that support conversation between one person and a plurality of persons, the display information generation device can also support conversation between a plurality of persons and a plurality of persons.

Figure 23:
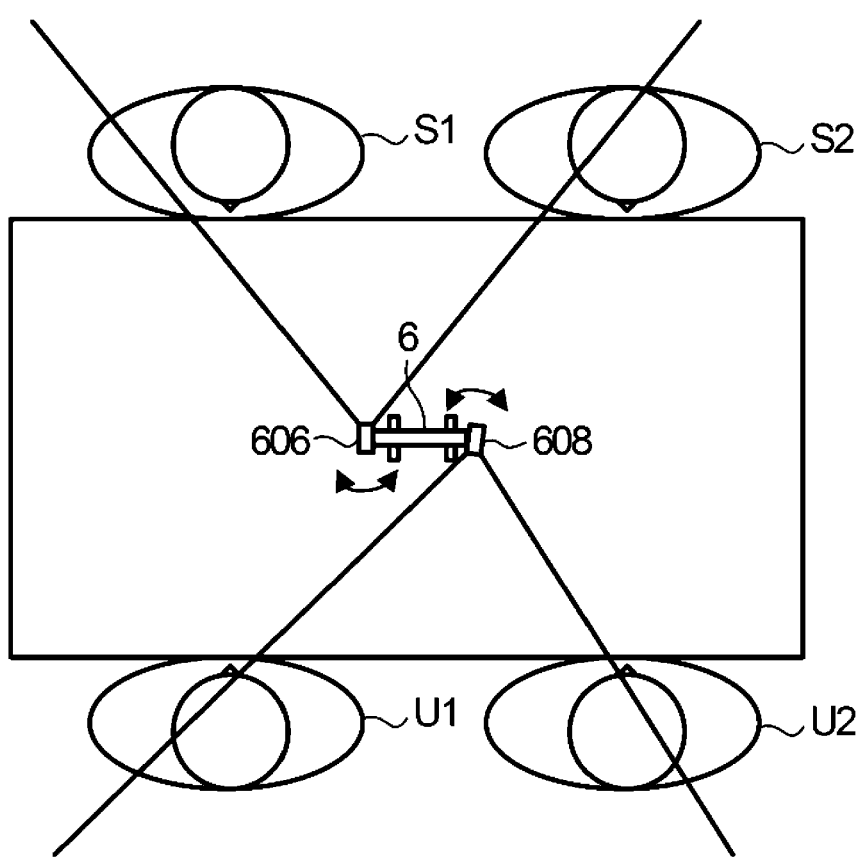
FIG. 23 is a schematic view illustrating a usage mode of an information presentation device including a display information generation device according to a third embodiment.

FIG. 23 is a schematic view illustrating a usage mode of an information presentation device 6 including a display information generation device according to a third embodiment. This is the situation where two users U1, U2 face two speakers S1, S2 who have a conversation with the users U1, U2. The information presentation device 6 is disposed between the users U1, U2 and the speakers S1, S2. Of course, the number of users and the number of speakers each are not limited to two, and may be three or more.

Figure 24A:
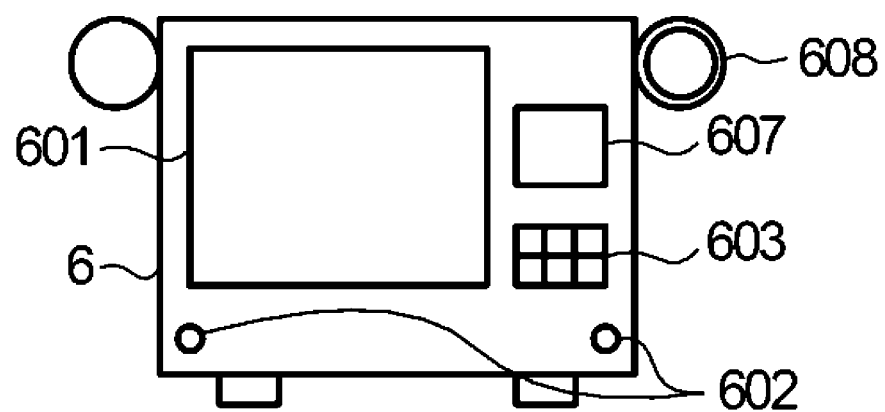
FIG. 24A is a front view of the information presentation device.
Figure 24B:
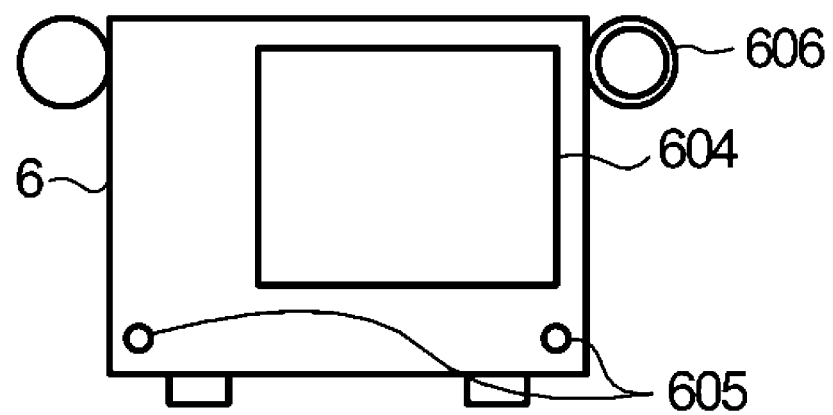
FIG. 24B is a rear view of the information presentation device.

FIG. 24A is a front view of the information presentation device 6, and FIG. 24B is a rear view of the information presentation device 6. The information presentation device 6 has the same configuration in appearance as that of the display terminal 2 described in the first embodiment. That is, a front display 601, a front stereo microphone 602, a keyboard 603, a front sub-display 607, and a front camera are disposed on the front face of the information presentation device 6. However, the front camera is formed as a direction-adjustable front camera 608 that can vertically and horizontally adjust its imaging direction. Similarly, a rear display 204, a rear stereo microphone 205, and a rear camera are disposed on the rear face of the information presentation device 6, and the rear camera is formed as a direction-adjustable rear camera 606 that can vertically and horizontally adjust its imaging direction. In using the information presentation device 6, the user U1 or U2 adjusts the imaging direction of the direction-adjustable front camera 608 such that a face of at least one of the users U1, U2 falls within the angle of view of the direction-adjustable front camera 608, and adjusts the imaging direction of the direction-adjustable rear camera 606 such that a face of at least one of the speakers S1, S2 falls within the angle of view of the direction-adjustable rear camera 606.

Figure 25:
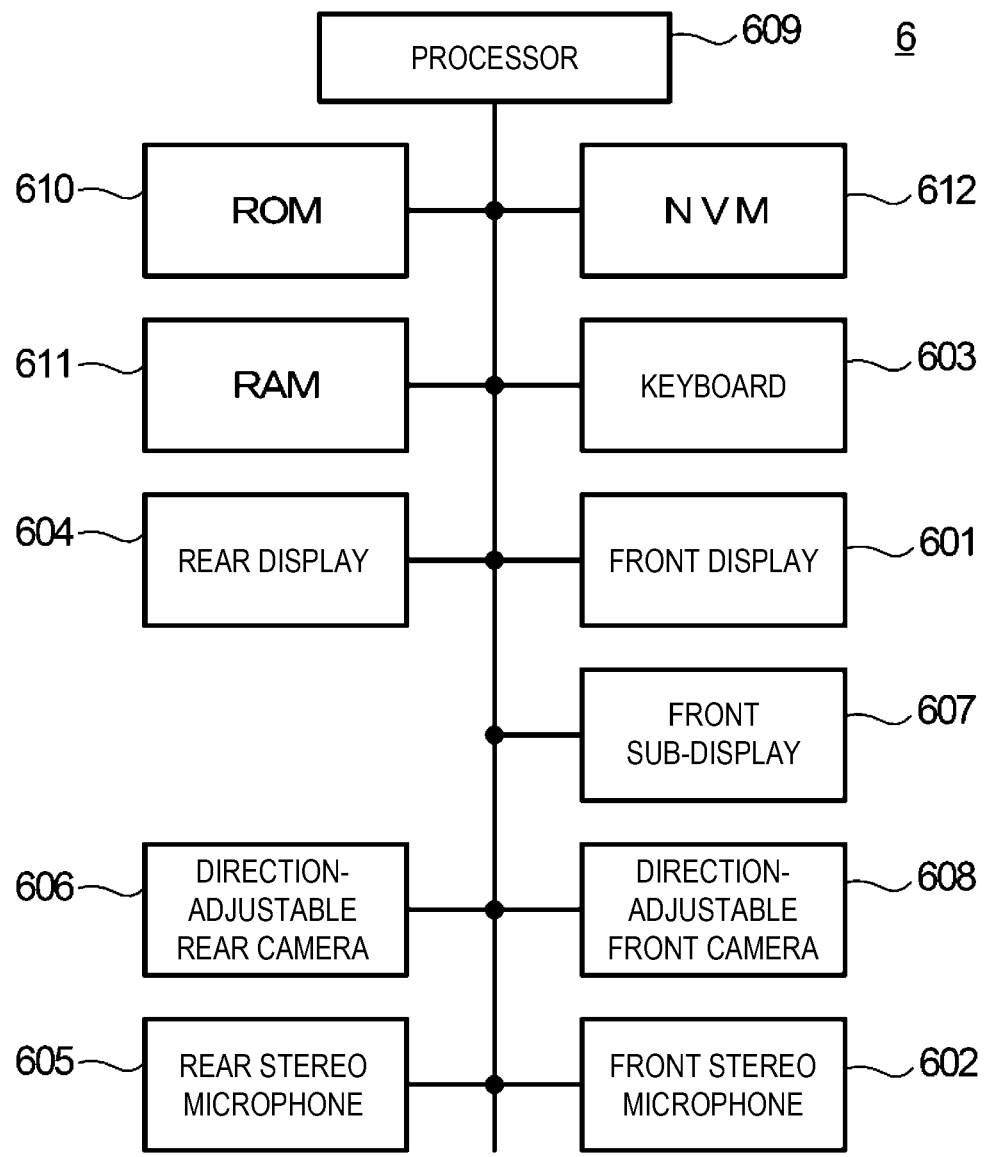
FIG. 25 is a block diagram of the information presentation device.

FIG. 25 is a block diagram of the information presentation device 6. The information presentation device 6 includes a processor 609, a ROM 610, a RAM 611, and an NVM 612 in addition to the components described above. The information presentation device 6 is unitary and thus, may not have a communication IF.

Figure 26:
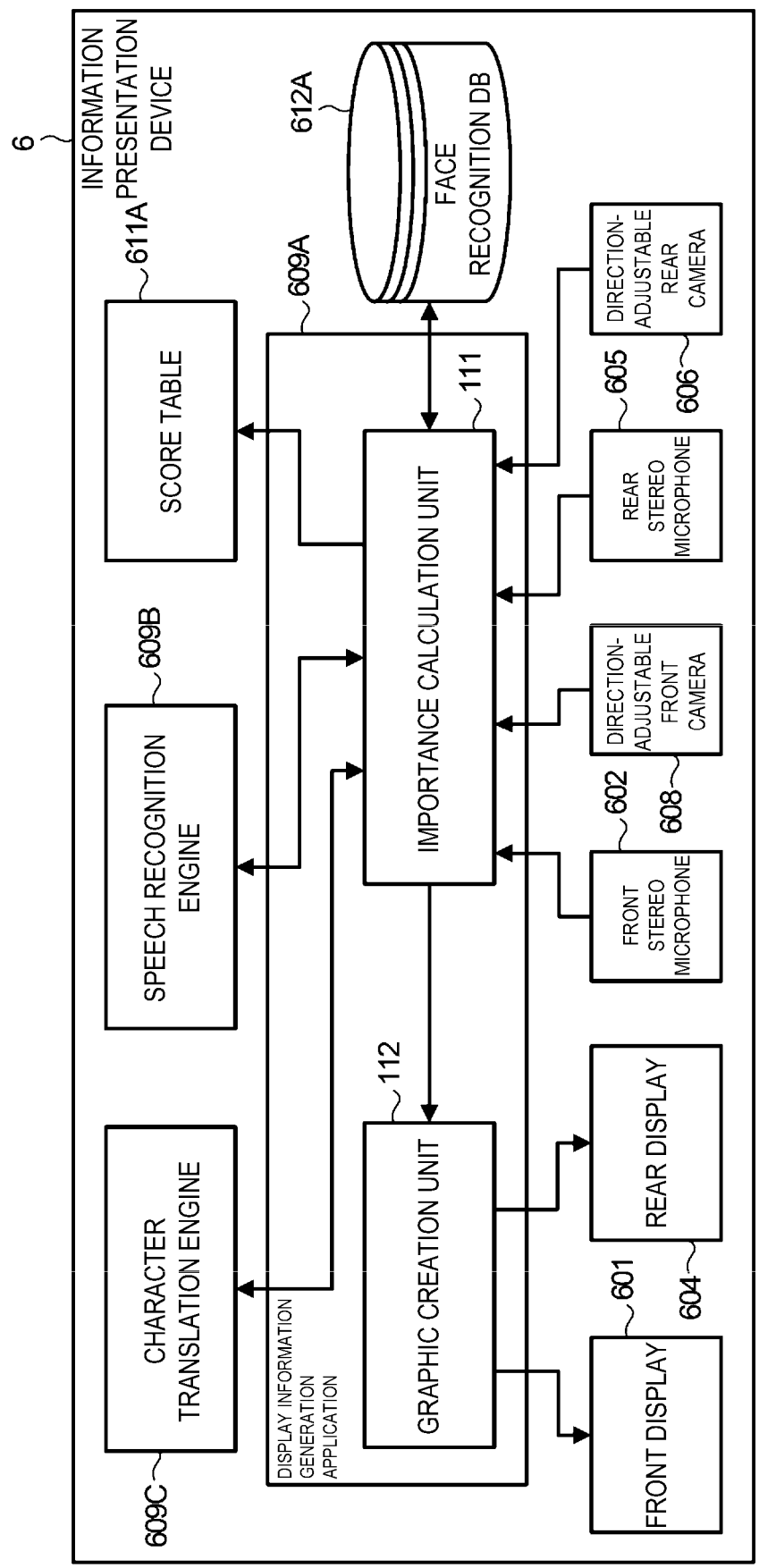
FIG. 26 is a functional configuration view of the information presentation device.

FIG. 26 is a functional configuration view of the information presentation device. A display information generation application 609A corresponds to the display information generation application 101A of the first embodiment, and provides the functions of the importance calculation unit 111 and the graphic creation unit 112. Speech objects from the front stereo microphones 602 and rear stereo microphone 605, and camera data objects from the direction-adjustable front camera 608 and the direction-adjustable rear camera 606 are output directly to the importance calculation unit 111. The graphic creation unit 112 outputs generated display result graphic data to the front display 601 and the rear display 604 for display. A speech recognition engine 609B, a character translation engine 609C, a score table 611A, and a face recognition DB 612A are similar to the speech recognition engine 101B, the character translation engine 101C, the score table 103A, and the face recognition DB 104A in the first embodiment, respectively.

The information presentation device 6 is unitary and does not have the communication IF, but may have the communication IF. Including the communication IF allows the use of external speech recognition engine and character translation engine.

In the information presentation device 6 with such configuration, the importance calculation unit 111 utilizes the first importance calculation technique, the second importance calculation technique, the third importance calculation technique, or a combination thereof to calculate the importance of the conversation and output the calculated importance of the conversation and the translation result character strings that are annotations to the graphic creation unit 112. In the present embodiment, the importance calculation unit 111 does not uniformly set the importance of the conversation for the user to "1.0" as in the first embodiment, but for each of the users U1, U2 similar to the speakers S1, S2, uses the first importance calculation technique, the second importance calculation technique, the third importance calculation technique, or a combination thereof to calculate the importance of the conversation. Accordingly, the translation result character strings of the spoken contents of the speakers S1, S2 can be displayed on the front display 601 in the display form depending on the importance of the conversation, and the translation result character strings of the spoken contents of users U1, U2 can be displayed on the rear display 604 in the display form depending on the importance of the conversation.

Although the information presentation device 6 having the translation function in the first embodiment has been described, it goes without saying that the information presentation device having no translation function for presenting speech recognition result character strings of spoken contents to the users U1, U2 and the speakers S1, S2 can be configured in a similar manner.

In the information presentation device 6 including the display information generation device according to the third embodiment, the importance calculation unit 111 receives user objects for a plurality of users U1, U2 and a plurality of speaker objects for a plurality of speakers S1, S2 who have a conversation with the plurality of users U1, U2, and a plurality of annotations with respect to each object generated for the respective objects. Then, based on at least one of the plurality of speaker objects or the plurality of annotations, the importance calculation unit 111 calculates the importance of the conversation of each of the speakers S1, S2 with the plurality of users U1, U2, and the importance of the conversation of each of the users U1, U2 with the plurality of speakers S1, S2. The graphic creation unit 112 determines a display form of each of the plurality of annotations generated for the plurality of user objects and the plurality of speaker objects based on the importance of each conversation calculated by the importance calculation unit 111, and generates display information on the plurality of annotations each having the display form. As a result, the display terminal 2 that displays the display information on the plurality of annotations generated by the graphic creation unit 112 can display the plurality of annotations in the display form depending on the importance of the conversation. Thus, the information presentation device 6 including the display information generation device according to the third embodiment can intelligently present which of the plurality of annotations for the plurality of speakers S1, S2 is important to the users U1, U2 and furthermore, can intelligently present which of the plurality of annotations for the plurality of users U1, U2 is important to the speakers S1, S2.

Note that the invention of the present application is not limited to the aforementioned embodiment and various modifications can be made without departing from the gist in the stage of implementation. Also, the embodiments may appropriately be performed in combination as long as possible, and in such a case, combined effects can be obtained. Further, the aforementioned embodiment include the invention in various stages, and various inventions can be extracted from appropriate combinations of a plurality of disclosed components.

REFERENCE SIGNS LIST

1: User terminal
2, 4: Display terminal
3: Access point virtual infrastructure
5, 6: Information presentation device
101, 209, 409, 505, 609: Processor
101A, 505A, 609A: Display information generation application
101B, 505B, 609B: Speech recognition engine
101C, 609C: Character translation engine
102, 210, 410, 506, 610: ROM
103, 211, 411, 507, 611: RAM
103A, 507A, 611A: Score table
104A, 508A, 612A: Face recognition DB
105, 501: Display
106: Touch panel
107, 212, 412: Communication IF
108, 406, 504: Camera
111: Importance calculation unit
112: Graphic creation unit
201, 601: Front display
201A: Displayed image
202, 602: Front stereo microphone
203, 502, 603: Keyboard
204, 604: Rear display
205, 605: Rear stereo microphone
206: Rear camera
206A: Camera data
207, 607: Front sub-display
208: Front camera
300: Display control application
301: Camera data transmission unit
302: Graphic return unit
401: Transmissive display
405, 503: Stereo microphone
606: Direction-adjustable rear camera
608: Direction-adjustable front camera

The invention claimed is:

1. A display information generation device comprising:
a processor; and
a storage medium having computer program instructions stored thereon, when executed by the processor, perform to:
receive at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects to calculate importance of the conversation between the at least one first speaker and each of the plurality of second speakers based on at least one of the plurality of second speaker objects or the plurality of annotations; and
determine a display form of each of the plurality of annotations generated with respect to the plurality of second speaker objects based on the importance of the conversation, and generate display information on the plurality of annotations, where size of display area for each of the plurality of annotations is directly proportional to the importance of the conversation associate with the annotation;
wherein the at least one first speaker object includes a speech object about speech made by the at least one first speaker,
the plurality of second speaker objects each include at least one of a speech object about speech made by each of the second speakers or the speech object about speech made by each of the second speakers and a camera data object imaging the plurality of second speakers,
the plurality of annotations each include at least one of character string of a speech recognition result from the speech object or a speech translation result acquired by translating the speech recognition result,
wherein the computer program instructions further perform to
calculates the importance of the conversation based on at least one of:
a ratio of an image of each of the second speakers in the camera data object;
dialog continuation utilizing dialog breakdown level detected from a character string of the speech recognition result corresponding to the at least one first speaker object or a character string of at least one of the speech recognition result or the speech translation result corresponding to each of the plurality of second speaker objects; and
scores of the previously scored second speakers using face recognition.

2. A display information generation device comprising:
a processor; and
a storage medium having computer program instructions stored thereon, when executed by the processor, perform to:
receive at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects to calculate importance of the conversation between the at least one first speaker and each of the plurality of second speakers based on at least one of the plurality of second speaker objects or the plurality of annotations; and
determine a display form of each of the plurality of annotations generated with respect to the plurality of second speaker objects based on the importance of the conversation, and generate display information on the plurality of annotations each having the display form,
wherein each of the plurality of second speaker objects includes a speech object about speech made by each of the second speakers,
the plurality of annotations each include a character string of at least one of a speech recognition result from the speech object or a speech translation result acquired by translating the speech recognition result,
the display information is an character string image displayed on a display screen, and
the display form includes at least one of a display position of the character string image on the display screen or a character enhancement in the character string image.

3. A display information generation method comprising:
receiving at least one first speaker object for at least one first speaker, a plurality of second speaker objects for a plurality of second speakers having a conversation with the at least one first speaker, and a plurality of annotations with respect to each object generated for the at least one first speaker object and the plurality of second speaker objects, and at a computer, calculating importance of the conversation between the at least one first speaker and each of the plurality of second speakers based on at least one of the plurality of second speaker objects or the plurality of annotations; and
at the computer, determining a display form of each of the plurality of annotations generated with respect to the plurality of second speaker objects based on the importance of the conversation, and generating display information on the plurality of annotations each having the display form;
wherein each of the plurality of second speaker objects includes a speech object about speech made by each of the second speakers,
the plurality of annotations each include a character string of at least one of a speech recognition result from the speech object or a speech translation result acquired by translating the speech recognition result,
the display information is an character string image displayed on a display screen, and
the display form includes at least one of a display position of the character string image on the display screen or a character enhancement in the character string image.

* * * * *